(12) United States Patent
Shoda

(10) Patent No.: US 8,049,908 B2
(45) Date of Patent: Nov. 1, 2011

(54) IMAGE PROCESSING APPARATUS AND IMAGE PROCESSING METHOD

(75) Inventor: Hirokazu Shoda, Yokohama (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 1071 days.

(21) Appl. No.: 11/670,711

(22) Filed: Feb. 2, 2007

(65) Prior Publication Data

US 2008/0187214 A1   Aug. 7, 2008

(51) Int. Cl.
*G06K 9/62* (2006.01)

(52) U.S. Cl. ......... 358/1.13; 358/1.9; 358/520; 382/162

(58) Field of Classification Search ................... 358/1.1, 358/1.9, 2.1, 3.24, 1.13, 501, 518, 520, 522; 382/162, 167, 168
See application file for complete search history.

(56) References Cited

U.S. PATENT DOCUMENTS

| 7,570,403 | B2* | 8/2009 | Sawada | 358/522 |
| 7,620,239 | B2* | 11/2009 | Minamino | 382/165 |
| 2003/0198382 | A1* | 10/2003 | Chen et al. | 382/173 |
| 2005/0078867 | A1* | 4/2005 | Kanno | 382/163 |
| 2005/0264849 | A1* | 12/2005 | Hagiwara | 358/2.1 |
| 2006/0187246 | A1* | 8/2006 | Miyagi | 347/5 |
| 2008/0056565 | A1* | 3/2008 | Minamino | 382/162 |
| 2008/0187244 | A1* | 8/2008 | Shoda | 382/294 |

FOREIGN PATENT DOCUMENTS

| JP | 11-187266 | 7/1999 |
| JP | 11-341280 | 12/1999 |
| JP | 2003-309725 | 10/2003 |

* cited by examiner

*Primary Examiner* — Thomas D Lee
(74) *Attorney, Agent, or Firm* — Turocy & Watson, LLP

(57) ABSTRACT

To obtain an image with good visibility by identifying an original document as being a color original document or a monochrome original document for every original document and using processing suitable for each for an image read by the image reading device.

To achieve the object, the invention includes: a color processing portion 77 that performs color image forming processing for a multi-color color original document made of more than one color; a color original document monochrome processing portion 74 that performs monochrome image forming processing for a monochromatic color original document made of a single color; a monochrome original document processing portion 73 that performs monochrome image forming processing different from the monochrome image forming processing by the color original document monochrome processing portion 74 for a monochrome original document; and a CPU 75 that enables appropriate selective use of the color processing portion 77, the color original document monochrome processing portion 74, and the monochrome original document processing portion 73 for each original document.

20 Claims, 20 Drawing Sheets

LINE SENSORS B, G, R: EACH HAVING 7500 PIXELS

SPECTRAL SENSITIVITY CHARACTERISTICS OF LINE SENSORS R, G, B

OUTPUT TO IMAGE PROCESSING
SUBSTRATE 14 SHOWN IN FIG. 9

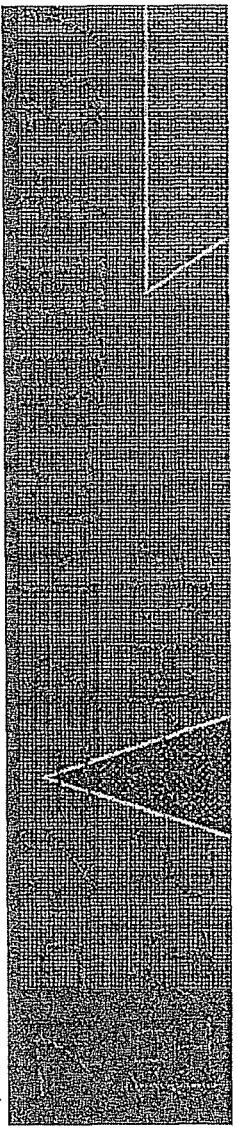
FIG.18(a) (ORIGINAL IMAGE)
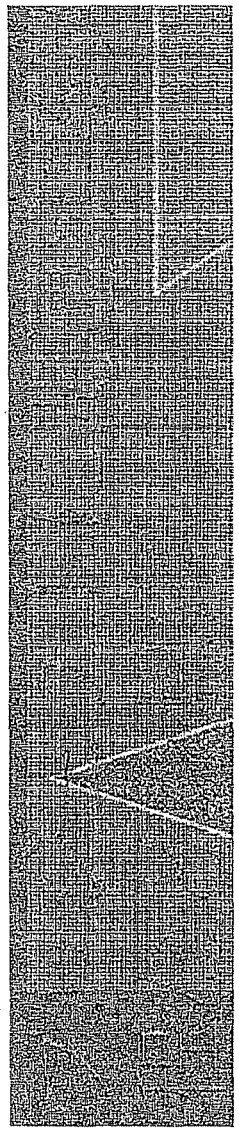
FIG.18(b) (MONOCHROME IMAGE IN RELATED ART)···VISIBILITY IS DETERIORATED BECAUSE THERE IS NO DIFFERENCE IN DENSITY BETWEEN RED CHARACTERS AND BLUE BACKGROUND
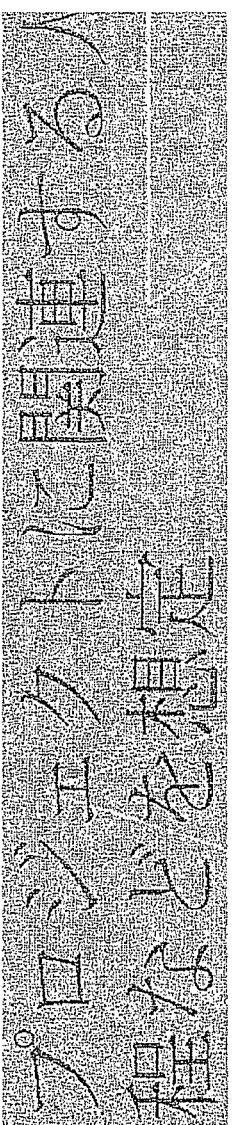
FIG.18(c) (MONOCHROME IMAGE OF THE INVENTION)···VISIBILITY IS SATISFACTORY BECAUSE THERE IS DIFFERENCE IN DENSITY BETWEEN READ CHARACTERS AND BLUE BACKGROUND

LINE SENSORS K, B, G, R: EACH HAVING 7500 PIXELS

IMAGE PROCESSING APPARATUS AND IMAGE PROCESSING METHOD

BACKGROUND OF THE INVENTION

1. Field of the Invention

The present invention relates to an image processing apparatus and an image processing method used for a scanner, a digital copying machine, and the like that read image information by scanning an original document with a CCD line sensor.

2. Description of the Related Art

As typical examples of a CCD line sensor used in a reducing optical system, there are a line sensor comprising a 1-line line sensor, and a sensor comprising a 3-line line sensor formed of three line sensors on the surfaces of which are respectively disposed color filters in red (hereinafter, occasionally abbreviated to R), green (hereinafter, occasionally abbreviated to G), and blue (hereinafter, occasionally abbreviated to B).

The 3-line CCD line sensor is basically used to read a color original document. In this case, a light source having oscillation wavelengths of 400 nm to 700 nm and thereby having spectral characteristics that sufficiently cover a visible light region is used, and separation of color information of R, G, and B is performed using the color filters disposed on the surfaces of the respective line sensors.

In addition, in a case where a monochrome original document is read using the 3-line CCD line sensor, there are a method by which one output from the 3-line CCD line sensor, that is, an output of the CCD line sensor for G in general, is used with the purpose of reading a seal in vermillion in a reliable manner, and a method by which black and white information is generated using all the outputs of the 3-line CCD line sensor.

According to these methods, whether an input original document is a color original document or a monochrome original document is determined using the 3-line line sensor comprising three line sensors on the surfaces of which are respectively disposed color filters, for example, in red, green and blue, and a color output is performed for a color original document and a monochrome output is performed for a monochrome original document at the time of output to the printer.

However, for an original document whose background alone is made of colors, a color output is performed because of the presence of a large number of color pixels regardless of the fact that they are not useful information as colors, which results in unnecessary consumption of toner particles.

Meanwhile, in a case where a monochrome output is performed for such an original document, the monochrome information can be calculated as:

(red information+blue information+green information)/3.

However, when this processing is used, for example, in a case where information is made of black characters on the base in blue, given that the outputs of the respective line sensors when reading the blue information of the base are (red:blue:green)= (40:60:120), and the outputs of the respective line sensors when reading the black character information are (red:blue: green)=(40:40:40), then, (40+60+120)/3=73 when the blue base information is converted to monochrome, and (40+40+40)/3=40 when the black character information is converted to monochrome.

It is therefore understood that when such a color original document is copied in monochrome, the densities are almost the same. Hence, in the case of the related art where whether an original document is a color original document or a monochrome original document is determined and an output is performed using the two methods, toner particles are consumed unnecessarily and smearing or fading occurs in the case of a monochrome output.

Similar techniques are disclosed in Official Gazette (A) JP-A-2003-274115 and Official Gazette (B) JP-A-11-187266. Official Gazette (A) describes a reading device using a 4-line line sensor but is silent about a correction of a monochrome signal using a color signal. Official Gazette (B) discloses a base removing method. However, it is configured so as to perform a density correction for RGB signals, and is different from the technique of the invention.

SUMMARY OF THE INVENTION

The invention was devised to solve the problems discussed above, and therefore has an object to provide an image processing apparatus and an image processing method for enabling an image with good visibility to be obtained by identifying an original document (for example, one by one) as being a color original document or a monochrome original document and using processing suitable for each for an image read by the image reading device.

In order to achieve the above and other objects, an image processing apparatus of the invention includes: a color processing unit configured to perform color image forming processing for a multi-color color original document made of more than one color; a first monochrome processing unit configured to perform monochrome image forming processing for a monochromatic color original document made of a single color; a second monochrome processing unit configured to perform monochrome image forming processing different from the monochrome image forming processing by the first monochrome processing unit for a monochrome original document; and a selection unit configured to enable appropriate selective use of the color processing unit, the first monochrome processing unit, and the second monochrome processing unit for each original document.

Also, another image processing apparatus of the invention includes: color processing means for performing color image forming processing for a multi-color color original document made of more than one color; first monochrome processing means for performing monochrome image forming processing for a monochromatic color original document made of a single color; second monochrome processing means for performing monochrome image forming processing different from the monochrome image forming processing by the first monochrome processing unit for a monochrome original document; and selection means for enabling appropriate selective use of the color processing means, the first monochrome processing means, and the second monochrome processing means for each original document.

In addition, the invention is an image processing method performed by a computer in an image processing apparatus, including the steps of: performing color image forming processing for a multi-color color original document made of more than one color as color processing; performing monochrome image forming processing for a monochromatic color original document made of a single color as first monochrome processing; performing monochrome image forming processing different from the monochrome image forming processing in the step of performing the first monochrome processing for a monochrome original document as second monochrome processing; and enabling appropriate selective use of the step of performing the color processing, the step of performing the first monochrome processing, and the step of performing the second monochrome processing for each original document.

BRIEF DESCRIPTION OF THE DRAWINGS

FIG. 18(a) is a view showing an original color image read for the image processing, FIG. 18(b) is a view showing a result of printing by the image processing in the related art, and FIG. 18(c) is a view showing the result of printing by the image processing according to one embodiment of the invention;

DESCRIPTION OF THE EMBODIMENTS

Hereinafter, embodiments of the invention will be described with reference to the drawings.

First Embodiment

Figure 1:
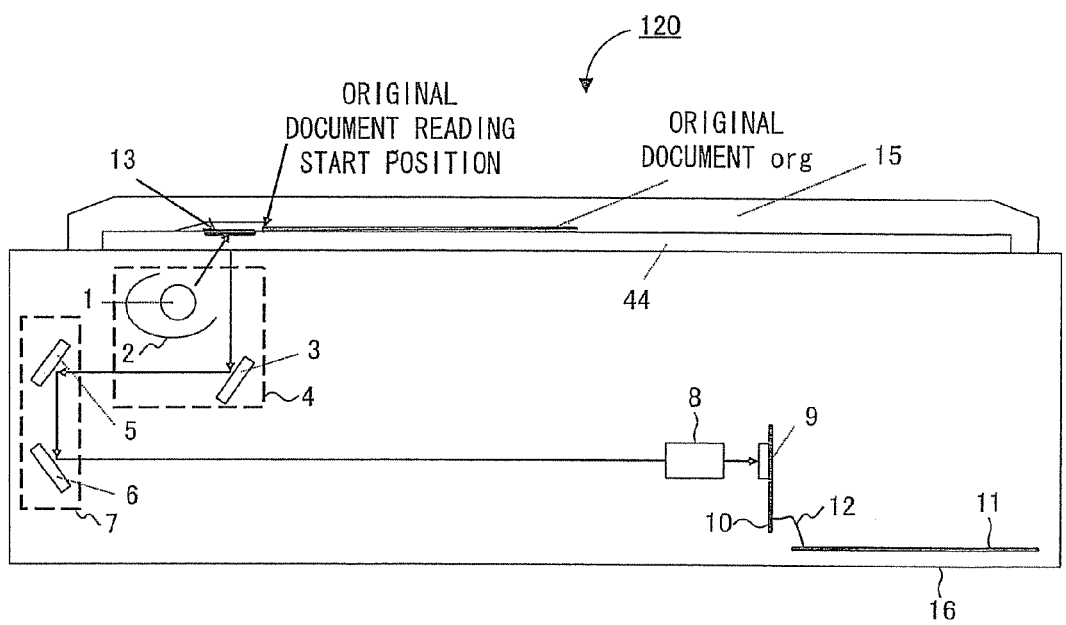
FIG. 1 is a side view schematically showing the configuration of an image reading device according to one embodiment of the invention.

FIG. 1 shows the configuration of an image reading device according to a first embodiment of the invention. In this image reading device (image reading portion described below) 120, an original document org is placed face down on a document glass plate 44. When a document fixing cover 15 provided to be free to open and close is closed, the original document org is pressed on the document glass plate 44. The original document org is irradiated by a light source 1, and reflected light from the original document org passes by a first mirror 3, a second mirror 5, a third mirror 6, and a collective lens 8 and reaches the sensor plane of a CCD line sensor 9 mounted on a CCD sensor substrate 10 to form an image thereon. Regarding the original document org, light irradiated from the light source 1 is scanned on the original document org as a first carriage 4 composed of the light source 1 and the first mirror 3 and a second carriage 7 composed of the second mirror 5 and the third mirror 6 are moved by an unillustrated carriage driving motor. In this case, because the moving velocity of the first carriage 4 is set twice as high as the moving velocity of the second carriage 7 for the movements of the first and second carriages, the optical path from the original document org to the CCD line sensor 9 is controlled to stay at a constant length.

The original document org placed on the document glass plate 44 in this manner is read successively line by line, and is converted to an analog electric signal corresponding to the strength of a light signal, which is reflected light, by the CCD line sensor 9. The converted analog electric signal is then converted to a digital signal and delivered via a harness 12 to a control substrate 11 that handles a control signal related to the CCD sensor. In the control substrate 11, digital signal processing, such as shading (distortion) correction to correct a low-frequency distortion caused by the collective lens 8 and a high-frequency distortion resulting from a variance in sensitivity of the CCD line sensor 9, is performed. It should be noted that the processing to convert the analog electric signal to the digital signal described above can be performed in the CCD sensor substrate 10 or in the control substrate 11 connected thereto via the harness 12.

When the shading correction descried above is performed, a signal used as the reference for black and a signal used as the reference for white are necessary. Herein, assume that the former black reference signal is an output signal of the CCD line sensor 9 in a state where the CCD line sensor 9 is not irradiated by light while the light source 1 is lit OFF, and the latter white reference signal is an output signal of the CCD line sensor 9 when a white reference plate 13 is read while the light source 1 is lit ON. When these reference signals are generated, signals for more than one line are averaged in general in order to reduce the influences of a singular point and a quantization error.

Figure 2:
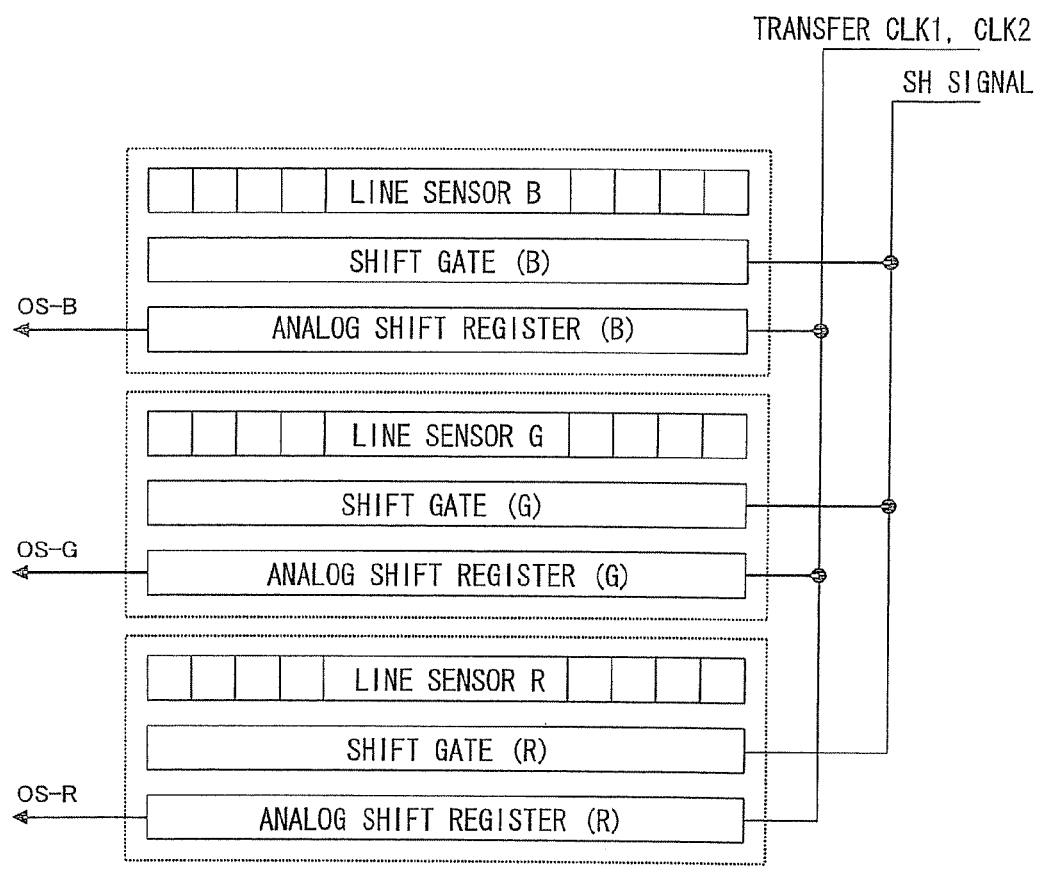
FIG. 2 is a view used to describe the configuration of line sensors in the image reading device of FIG. 1.

The configuration and operations of the CCD line sensor shown in FIG. 1 will now be described with reference to FIG. 2 and FIG. 3. FIG. 2 is a view schematically showing the configuration of a 3-line CCD sensor as one example of this embodiment composed of three line sensors on the light-receiving surfaces of which are respectively disposed color filters in blue, green, and red (hereinafter, abbreviated to B, G, and R, respectively), that is, a line sensor B, a line sensor G, and a line sensor R. The line sensors B, G, and R are formed of photo diode arrays and perform photoelectric conversion operations.

For example, in the case of an A4-size original document, the original document org has an area of 297 mm in the longitudinal direction and 210 mm in the transverse direction. In a case where an original document reading operation is performed by defining the longitudinal direction as the main scanning direction and the transverse direction as the sub-scanning direction, at least 7016 pixels are necessary as the effective pixels in the photo diode arrays in the CCD line sensor 9. Generally, a sensor having 7500 pixels is used. In addition, as is shown in FIG. 3, the CCD line sensor has a light shield pixel portion shielded against light by aluminum or the like in part of the photo diode array to prevent light from coming incident on the preceding stage of 7500 pixels as the effective pixels, and dummy pixel portions and empty transmission portions before and after the effective pixels. Hence, in order to output all the charges accumulated in the CCD line sensor, transfer CLK's in number exceeding the 7500 pixels are necessary. Herein, assume that a total of the light shield pixel portion, the empty transmission portions, and the dummy pixel portions outside of the effective pixel region is comparable to 500 transfer CLK's. Then, in order to output all the charges accumulated in one line of the CCD line sensor to the outside of the CCD line sensor, a time comparable to 8000 transfer CLK's is necessary, and this time is found to be a light accumulation time (tINT) for one line.

In addition, as the characteristic of the output signal of the CCD line sensor, a signal is outputted in reference to a voltage level to which a specific offset is assigned with respect to the electric reference level (GND). This voltage level used as the reference is referred to as the signal output direct current voltage (offset level: Vos). Light energy irradiated to the line sensor when an SH signal within the 1-line light accumulation time (tINT) shown in FIG. 3 is at the "L" level is accumulated in the photo diode as charges, and when the SH signal is at the "H" level, the accumulated charges pass through the shift gate adjacent to the photo diode and are further transferred to the adjacent analog shift register. When this transfer operation ends, the SH signal is shifted to the "L" level to operate the shift gate for a charge accumulation operation to be performed again in the photo diode while preventing charges from leaking to the outside of the photo diode.

The charges transferred to the analog shift register are transferred to the outside in cycles of the transfer CLK by the unit of pixel. Because of this operation, application is performed with the SH signal so as to suspend the transfer CLK during a period in which charges are migrating from the photo diode to the analog shift register by passing through the shift gate (see FIG. 3). Even in a case where the transfer CLK is inputted constantly and the transfer CLK is suspended correspondingly to the SH signal inside the CCD line sensor, the charge transfer operation in the inside is the same. There is a case where the polarities of the SH signal and the transfer CLK are different from those in FIG. 3 depending on the CCD line sensors; however, the operation inside the sensor is the same.

The time comparable to 8000 transfer CLK's described above is described not as the number of CLK's but as the time regardless of the transfer CLK suspending state at the time of SH signal. For example, given an image transfer frequency f=20 MHz for a 4-line CCD sensor, then, in order to output all the charges accumulated in one line of the line sensor CCD to the outside, a time calculated as:

$$8000(CLK's) \times (1/20 \text{ MHz}) = 400 \text{ } \mu s$$

is necessary, and this time is found to be the light accumulation time of the line sensor for one line in the sub-scanning direction.

Hereinafter, the relation with the analog signal amplitude outputted from the line CCD sensor 9 will be described on the assumption that the frequency of the transfer CLK (cycle t0) is 20 MHz and the 1-line light accumulation time tINT is 400 μs. However, it goes without saying that these transfer CLK frequency and 1-line light accumulation time vary with the specifications of the products.

Figure 4:
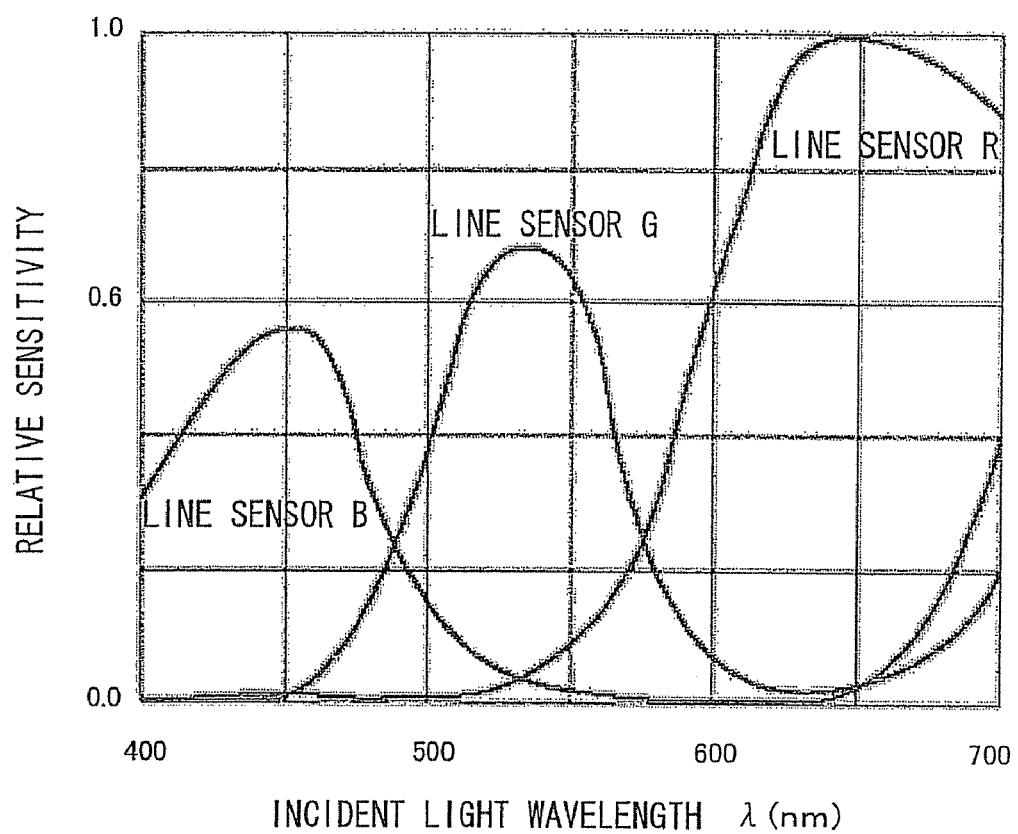
FIG. 4 is a graph showing relative sensitivities of line sensors R, G, and B shown in FIG. 2 with respect to the wavelength of incident light.
Figure 5:
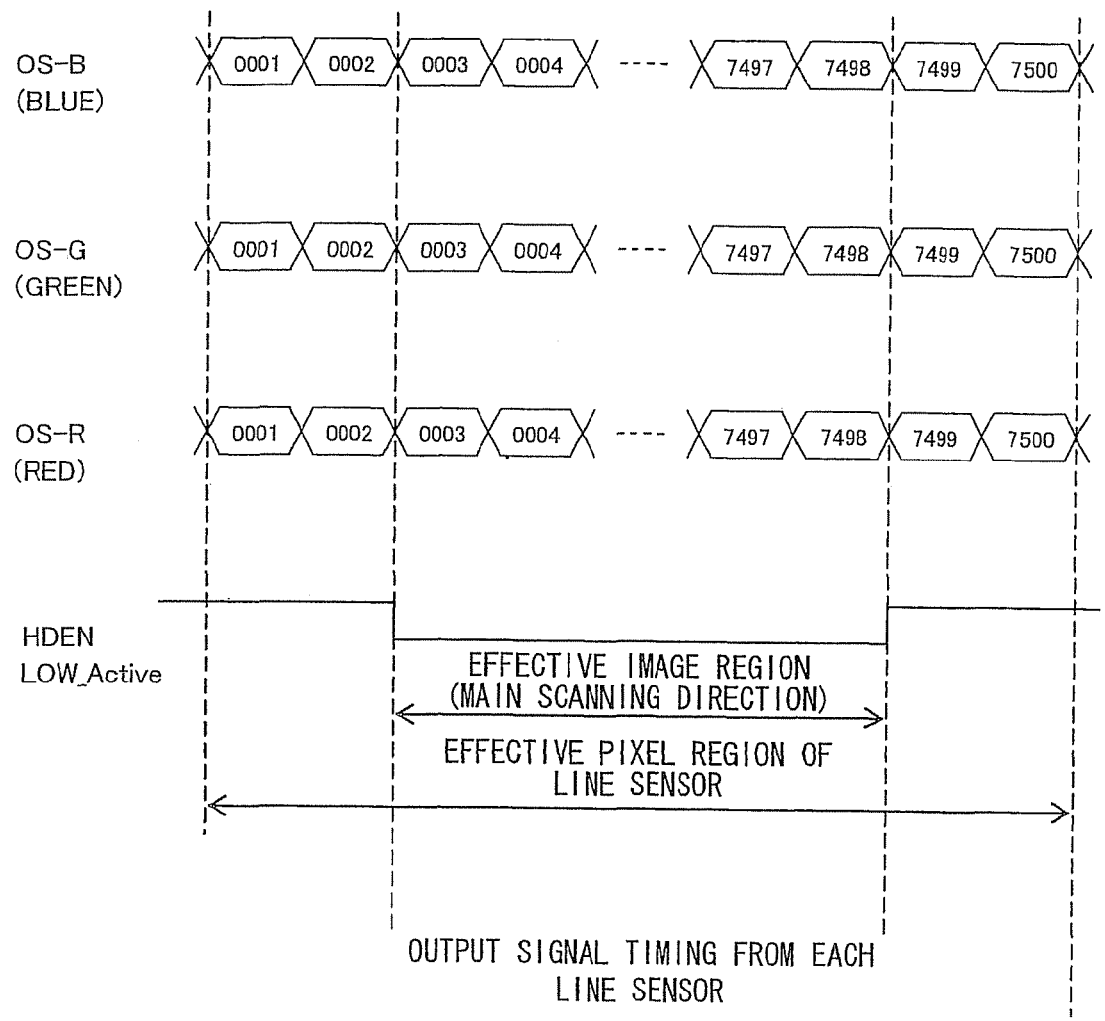
FIG. 5 is a time chart used to describe timing of output signals from the line sensors R, G, and B of FIG. 2.
Figure 6:
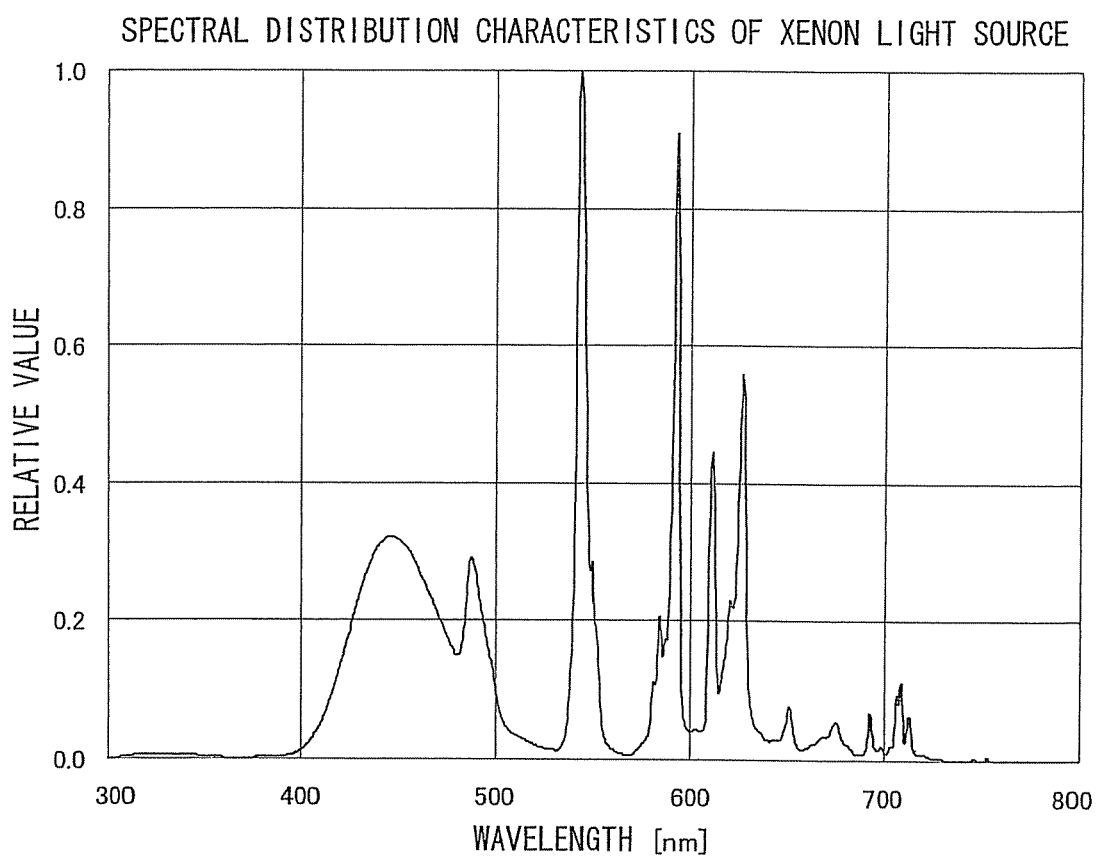
FIG. 6 is a graph showing the spectral distribution characteristic of a xenon light source.

FIG. 4 shows the spectral sensitivity characteristics of the CCD line sensors R, G, and B. As has been described, the CCD line sensor 9 is formed of the line sensors R, G, and B on which the color filters are disposed. In a case where light from the light source is irradiated uniformly to these line sensors, the line sensor R, the line sensor G, or the line sensor B has sensitivity to wavelengths in a particular range. As is shown in FIG. 5, signals outputted from the CCD line sensor 9 are outputted in synchronization for B, G, and R. In addition, not the entire effective pixel region of the CCD line sensor 9 is used as an image, and of the entire region, pixels in the appropriate number for the read image are selected as the effective image region (the "L" level period of HDEN signal). For reference, one example of the spectral distribution of a xenon light source is shown in FIG. 6.

Figure 7A:
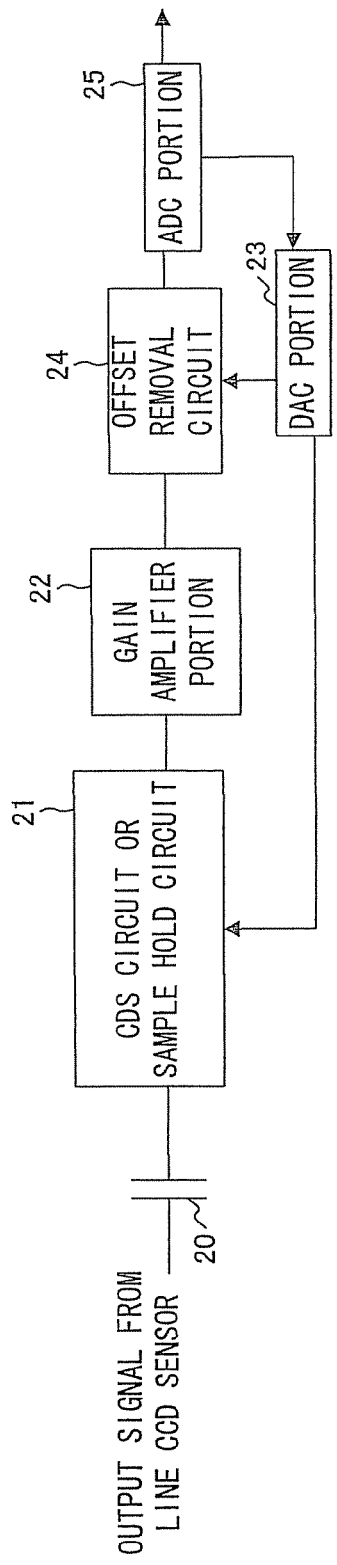
FIG. 7(a) is a block diagram showing an analog processing circuit that processes output signals of a CCD line sensor.
Figure 7B:
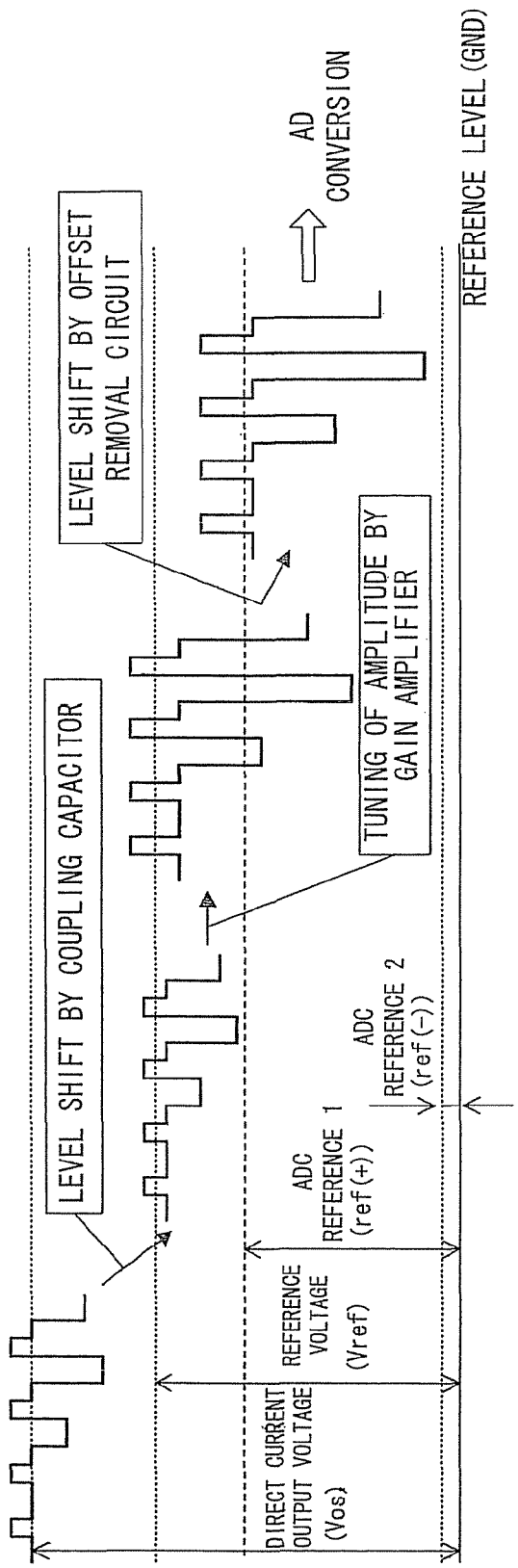
FIG. 7(b) is a time chart used to describe the processing by the circuits of FIG. 7(a)

FIG. 7(a) is a block diagram schematically showing the configuration of an analog processing circuit for an analog signal outputted from the CCD line sensor 9. FIG. 7(b) is a time chart to describe the analog waveforms in the processing circuits shown in FIG. 7(a). A various analog processing circuit 11C (see FIG. 8) for an analog signal outputted from the CCD line sensor 9 is generally formed of a coupling capacitor 20, a CDS (Correlated Double Sampling) circuit, which is a correlated double sampling circuit, or sample hold circuit 21, a gain amplifier portion 22, a DAC (Digital Analog Converter) portion 23 that converts a digital signal to an analog signal, an offset removing circuit 24 that removes a direct current component, and an ADC (Analog Digital Converter) portion 25 that converts an analog signal to a digital signal.

Concrete operations of the circuits of FIG. 7(a) will now be described using FIG. 7(b). As is also shown in FIG. 3, an output signal from the CCD line sensor 9 is outputted in reference to the signal output direct current voltage (Vos). The signal output direct current voltage (Vos) varies with the CCD line sensor 9, and in the case of a CCD line sensor using a+12 V power supply, it has a variance of about 3 to 8 V. The coupling capacitor 20 is connected thereto in series with the purpose of removing the direct current component of a signal having this uncertain level. In this instance, for the processing of the CDS circuit or sampling circuit 21, processing to match the potential of the dummy pixel portions or the light shield portion shown in FIG. 3 to the reference potential (Vref) is performed.

Subsequently, processing to match the analog signal from the CCD line sensor, from which the direct current component has been removed, to the input range of the ADC portion 25 at the latter stage is performed. In this instance, a direct current voltage to match the direct current component to the input range is generated in the DAC portion 23, and the direct current component is tuned again by the CDS (Correlated Double Sampling) circuit, which is a correlated double sampling circuit, or sample hold circuit 21 and the offset removing circuit 24, so that the voltage of the light shield portion of the CCD sensor matches the direct current voltage.

As is shown in FIG. 7(b), given ADC reference 1 (ref(+)) as the reference voltage on the "H" level side and ADC reference 2 (−) as the reference voltage on the "L" level side needed for the conversion in the ADC 25, then processing is performed for the signal to fall within this voltage range. In this instance, because the output of the ADC 25 saturates upon input of a signal that exceeds the ADC reference 1 (ref(+)) or drops below the ADC reference 2 (ref(−)), the signal is controlled so as not to go out of these references on any terms.

Figure 8:
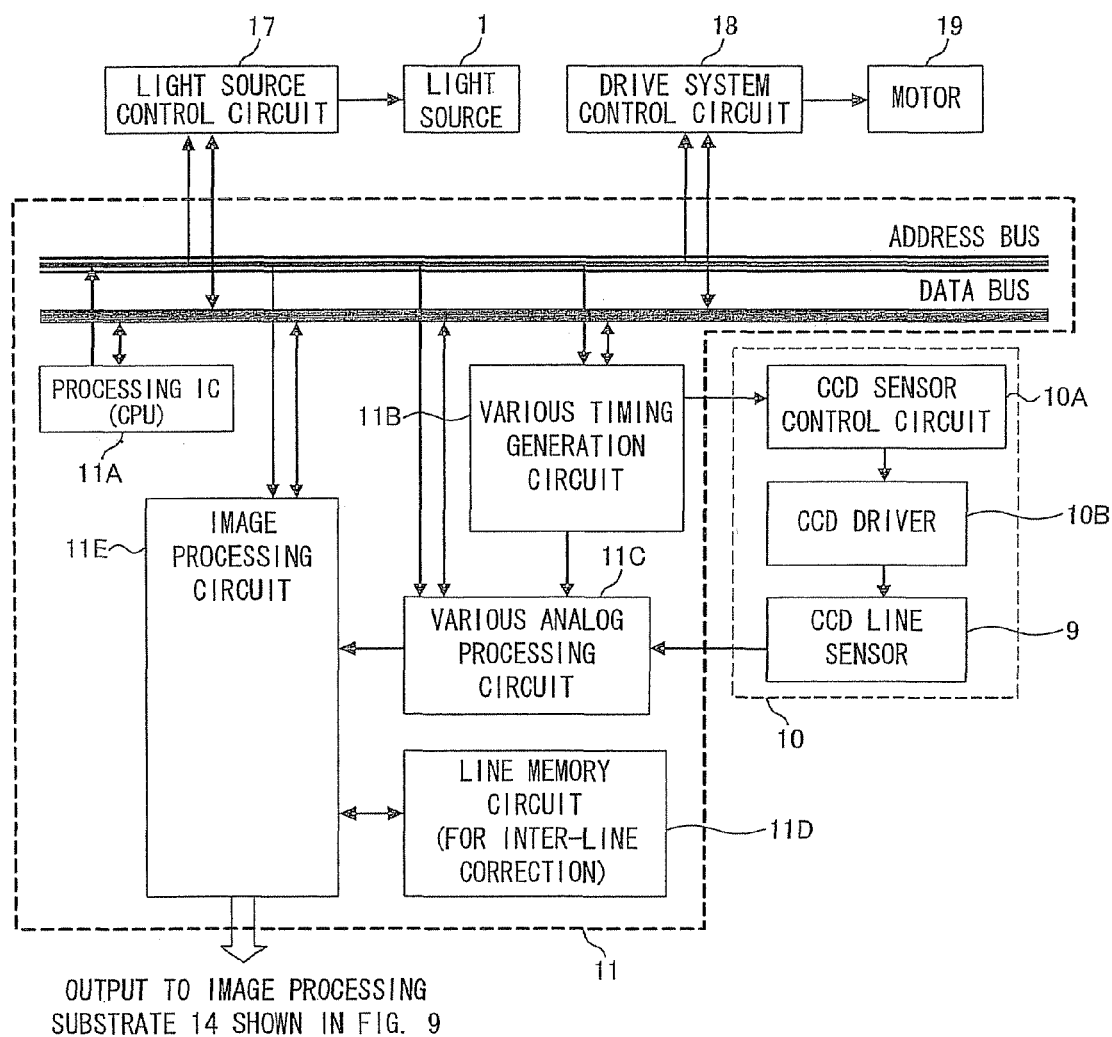
FIG. 8 is a block diagram showing in detail a CCD sensor substrate and a control substrate shown in FIG. 1.

FIG. 8 schematically shows the configuration of the control substrate 11 and the CCD sensor substrate 10 shown in FIG. 1. The control substrate 11 is formed of a processing IC (CPU) 11A, such as a CPU, a various timing generation circuit 11B, the various analog processing circuit 11C shown in FIG. 7(a), a line memory circuit 11D, and an image processing circuit 11E. The processing IC 11A not only controls a signal processing system of the CCD line sensor 9, but also controls a light source control circuit 17 that controls the light source 1 and a driving system control circuit 18 that controls a motor 19 for moving the first carriage 4 and the second carriage 7 using control signals of an address bus, a data bus, and the like.

Figure 3:
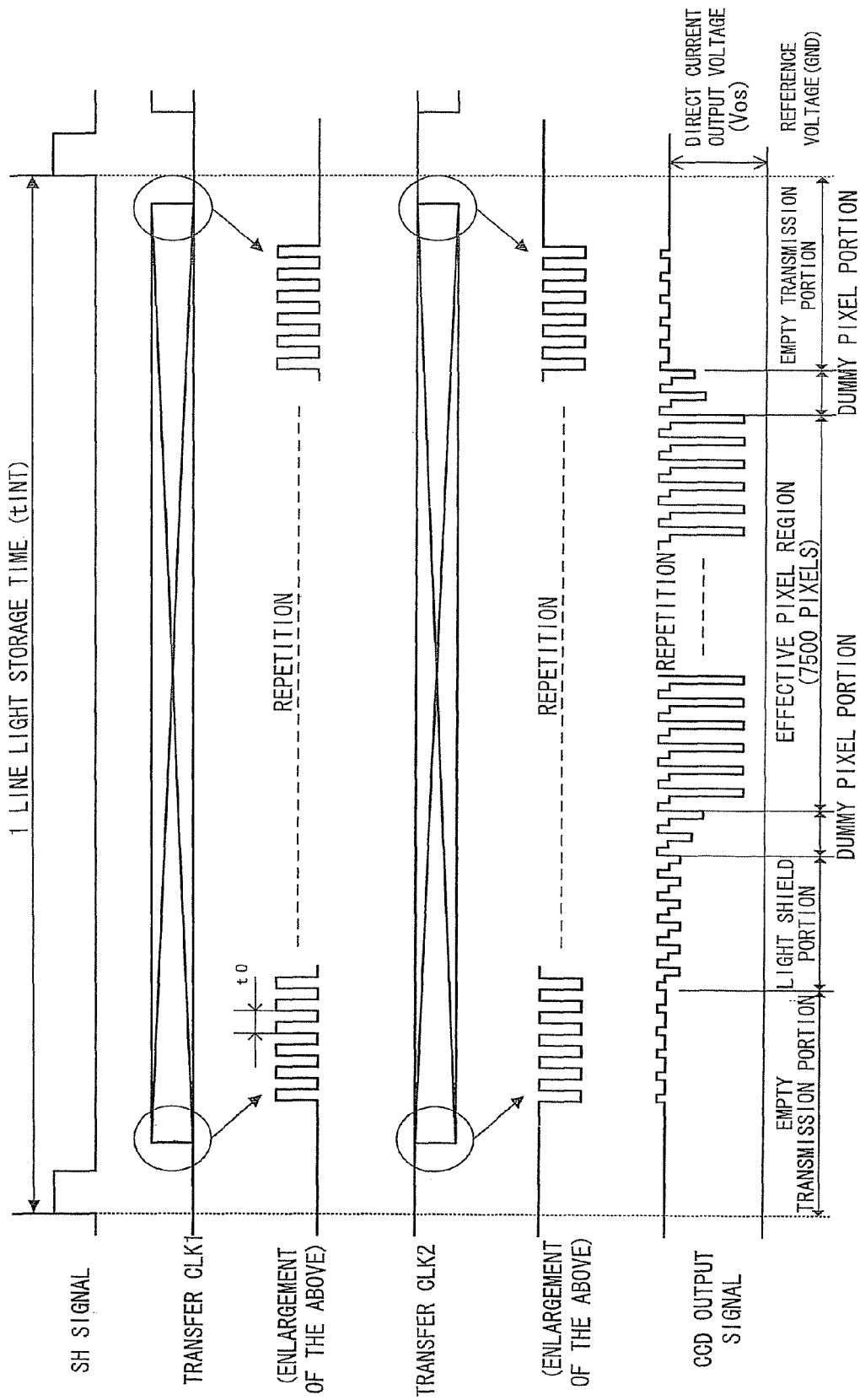
FIG. 3 is a time chart used to describe driving of the line sensors shown in FIG. 2.

The various timing generation circuit 11B generates signals necessary to drive the CCD line sensor 9, such as the SH signal and the transfer CLK's 1 and 2 shown in FIG. 3, and signals necessary for the various kinds of analog processing shown in FIG. 7(a). For the signals necessary to drive the CCD line sensor 9 and generated in the various timing generation circuit 11B, timing is adjusted by a CCD sensor control circuit 10A, and they are inputted into the CCD line sensor 9 via a CCD driver 10B used for matching the signal amplitude levels or shaping the waveform. Herein, there will be no problem when the CCD sensor control circuit 10A is included in the various timing generation circuit 11B. An output from the CCD line sensor 9 is inputted into the various analog processing circuit 11C, and subjected to various kinds of analog processing by the circuits shown in FIG. 7(a). In FIG. 8, the various analog processing circuit 11C is illustrated as a component of the control substrate 11. However, there will be no functional problem even when it is disposed on the CCD sensor substrate 10.

As is shown in FIG. 2, in the CCD line sensor 9, respective line sensors are disposed physically spaced apart, and this gives rise to displacement of the reading position among the respective line sensors. The reading position displacement is corrected by the line memory circuit 11D. In the image processing circuit 11E, not only the control of the line memory circuit 11D is performed, but also processing, such as the shading correction and the logarithmic transformation using an image signal converted to a digital signal, is performed. The RGB signals having undergone various kinds of processing are outputted to an image processing portion 14 incorporated into an image processing substrate shown in FIG. 9.

Figure 9:
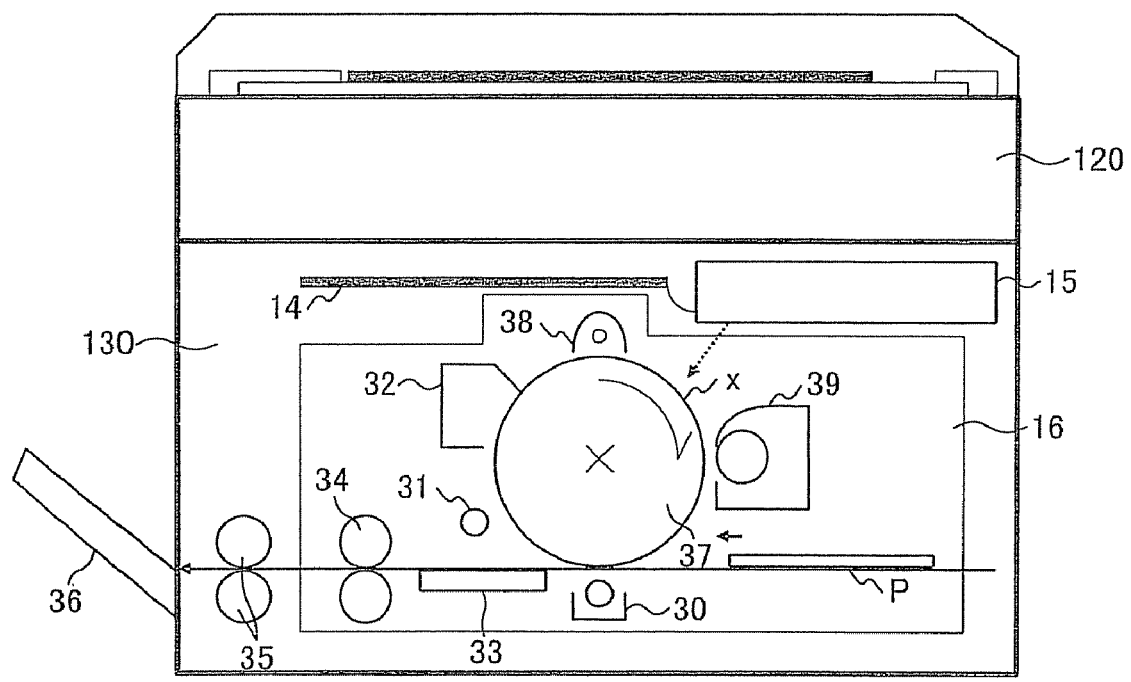
FIG. 9 is a view showing the configuration of a digital copying machine according to one embodiment of the invention.

FIG. 9 is a view schematically showing a digital copying machine formed of an image reading device (scanner portion) and a printer portion that forms an image on a sheet of paper. A printer portion 130 shown in FIG. 9 is illustrated as one example of the configuration to generate a monochrome image from an original document read by a scanner portion 120. The printer portion 130 is formed of the image processing portion 14 that performs processing necessary to form an image, for example, the filter processing and the tone processing, to image data read by the CCD line sensor 9 in the scanner portion 120 so as to be converted into a control signal of an unillustrated light-emitting element, such as a semiconductor laser, a laser optical system unit 15 in which is disposed a light emitting element, such as a semiconductor laser, for forming a latent image on a photoconductive drum 37, and an image forming portion 16. The image forming portion 16 is formed of the photoconductive drum 37, a charging device 38, a developing device 39, a transfer charger 30, a stripping charger 31, a cleaner 32, a paper carrying mechanism 33 for carrying a sheet of paper P, and a fixing device 34, all of which are necessary to form an image by the electrophotographic process. A sheet of paper P on which is formed an image by the image forming portion 16 is discharged onto a paper discharge tray 36 via a paper discharge roller 35.

The determination as being a color original document or a monochrome original document and the processing for each in this embodiment are performed also in the image processing portion 14, which will be described below in detail.

Figure 10:
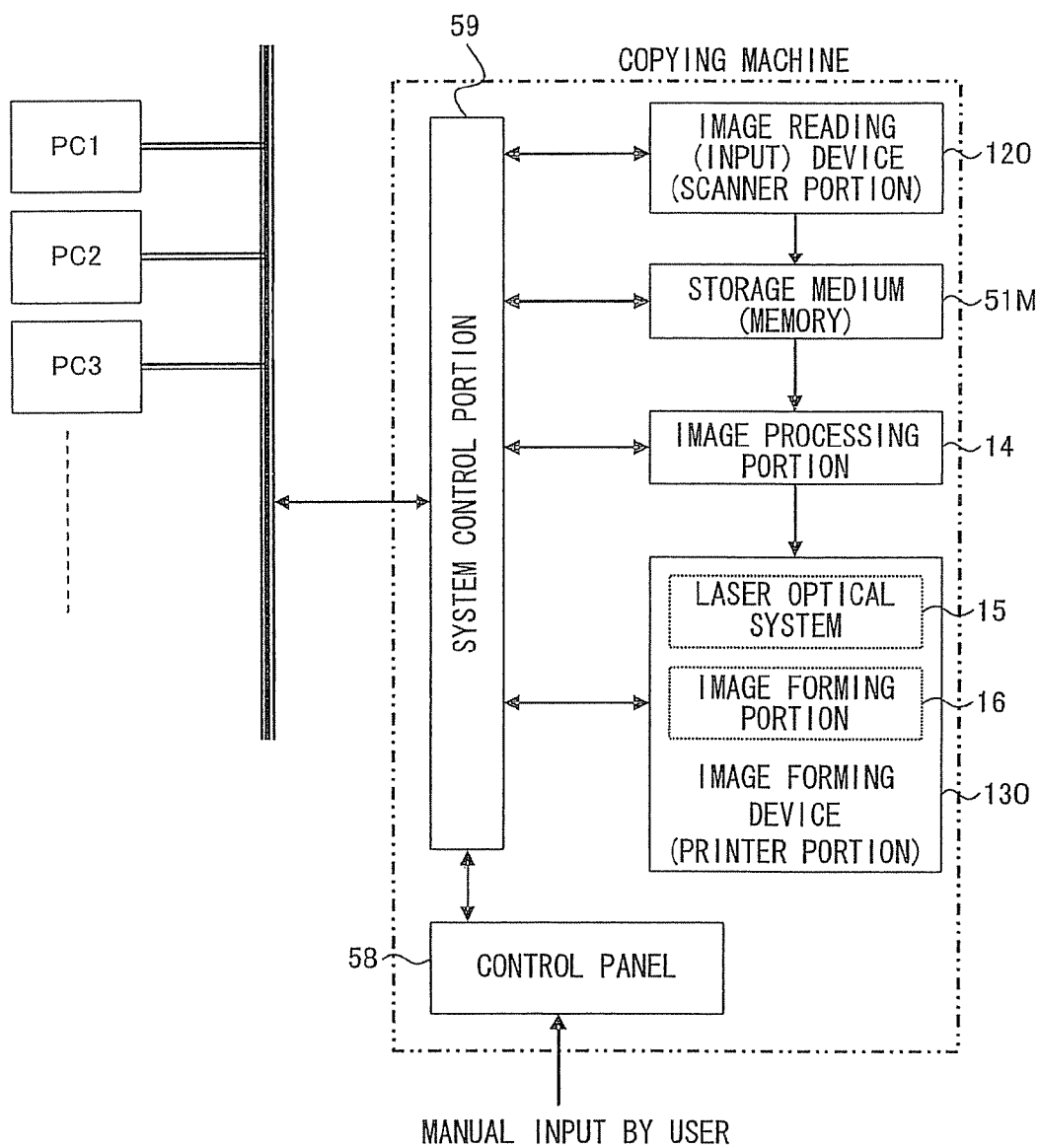
FIG. 10 is a block diagram showing the overall system of the copying machine shown in FIG. 9.

FIG. 10 is a block diagram schematically showing the overall system configuration of the image processing apparatus formed of the image reading device and the image forming device as is shown in FIG. 9. This system includes the scanner portion (image reading device) 120, a memory 51M formed of a recording medium, the image processing portion 14 that performs various kinds of image processing, the laser optical system 15 using a semiconductor laser, and the image forming portion 16 that forms an image using toner particles by the electrophotographic process, plus a system control portion 59 that controls the foregoing components and a control panel 58 through which the user directly makes an input. The laser optical system 15 and the image forming portion 16 together form the image forming device (printer portion) 130.

Herein, the image processing portion 14 corresponds to the image processing apparatus of the invention. In this embodiment, the image processing portion 14 and the image reading device (scanner portion) 120 are provided separately. It goes without saying, however, that it is possible to provide an image reading device formed of these components that are made into one piece, or it is possible to provide an image forming device in which the image processing portion 14 is provided integrally with the image forming device 130.

Figure 11:
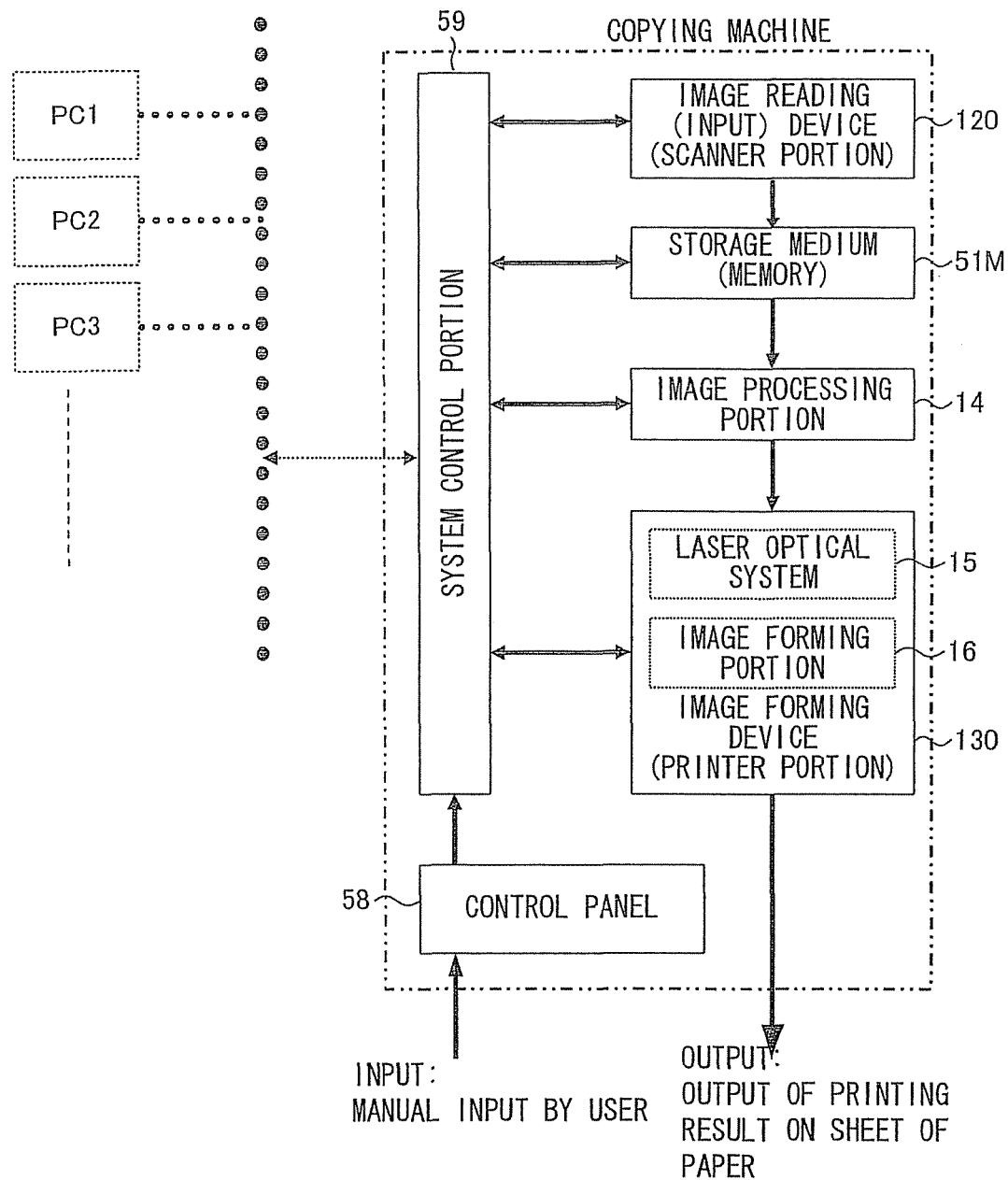
FIG. 11 is a block diagram used to describe a state where the copying machine is operating independently.
Figure 12:
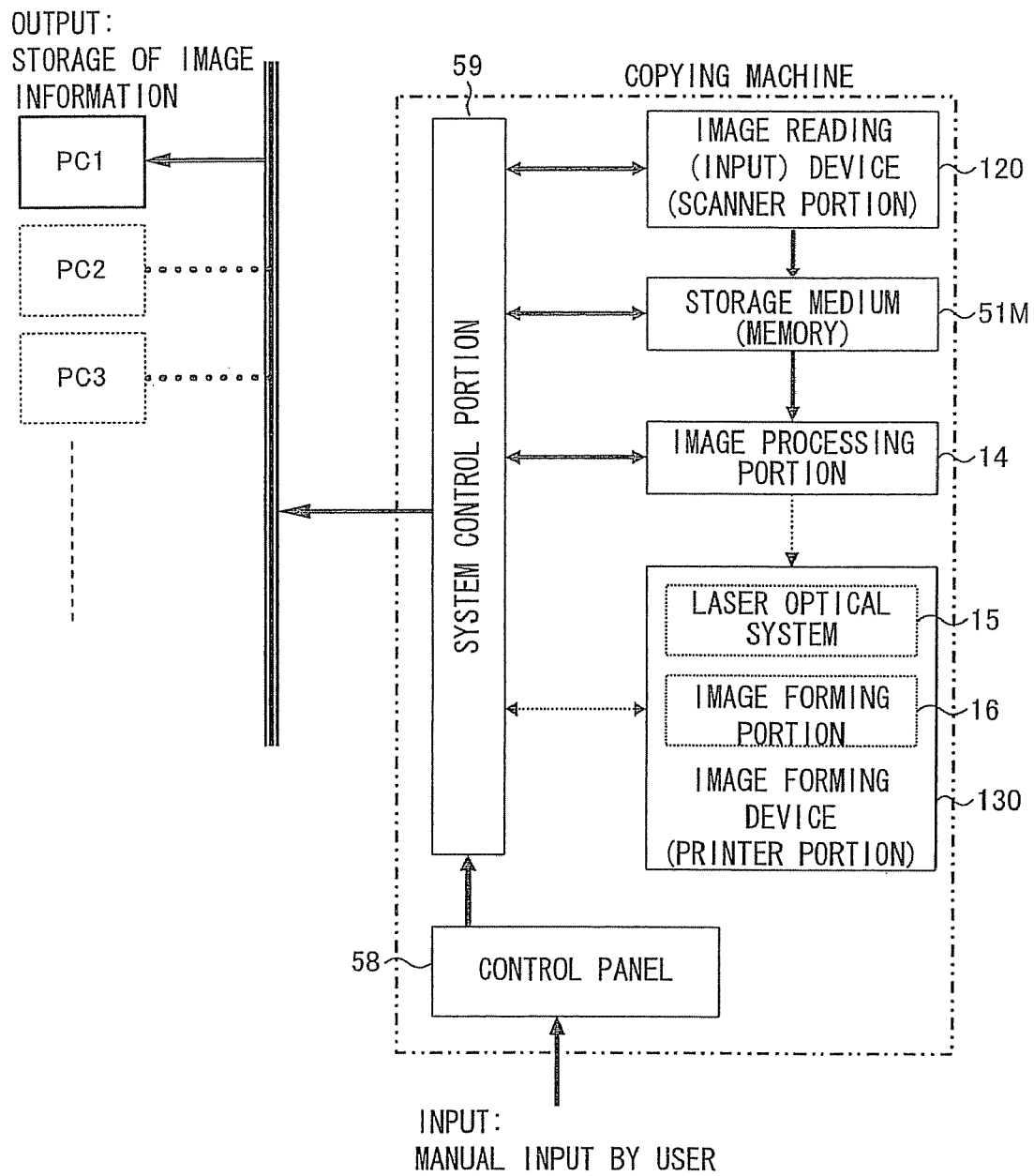
FIG. 12 is a block diagram used to describe a state where image information is read by a scanner portion serving as a network scanner, and the image information is outputted to a computer over a network connection via a system control portion.

FIG. 11 is an explanatory view in a case where the system of FIG. 10 is used as a copying machine. FIG. 12 is an explanatory view in a case where the system of FIG. 10 is connected to a network, so that it is used as a scanner by external computers PC1, PC2, PC3, and so forth.

Referring to FIG. 11, the apparatus is connected to the network via the system control portion 59; however, regarding the operations, it operates as a single unit of a copying machine. Initially, the user sets an original document org of which he wishes to make a copy on the scanner portion 120 serving as the image reading device, and performs desired settings from the control panel 58. The control panel 58 is formed of a copy and scanner button to make the setting as to whether the image processing apparatus is used as a copying machine to execute a copy job or it is used as the scanner serving as the image reading device, an original document mode specifying button to specify an original document mode, a display portion to display zooming up and down processing and the number of copies being set, key buttons to input a desired number of copies, a copy number set portion formed of a clear button to clear an input numerical value, a reset button to initialize the conditions set by the control panel, a stop button to abort a copy operation or a scanner operation, and a start button to start the copy operation or the scanner operation. The various set buttons on the control panel may be formed of, for example, a touch panel using liquid crystals, and used also as the display portion.

The color and monochrome mixed mode (Auto Color Select: ACS mode) in this embodiment of the invention is specified using the control panel. The ACS mode will be described below. The control panel 58 forms a color original document mixed mode setting unit (setting means) of the invention.

When the original document org is set, the document pressing cover 15 is closed, and the kind of the original document, the paper size to be outputted for the original document size, the number of copies to be made for one original document, and so forth are set using the control panel 58, after which the start button is depressed to start the copying operation. In this instance, the image information read by the scanner portion 120 is temporarily stored in the memory 51M, which is a storage medium (device). The memory is formed of a page memory having a capacity larger than a capacity to store all the image information of the largest copy size available. An image signal outputted from the memory is subjected to processing, such as the filter processing and the tone processing, in the image processing portion 14, and converted to a control signal of the semiconductor laser, which is inputted into the laser optical system 15 at the latter stage. The image signal is converted to a light output of the semiconductor laser in the laser optical system 15, which is irradiated to the photoconductor 37 in the image forming portion 16. The image forming portion 16 then forms an image by the electrophotographic process.

An example of operations as the network scanner that outputs the image information read by the scanner portion 120 in the form of an image to a computer over the network connection via the system control portion 59 will now be described with reference to FIG. 12. The user sets the original document org in the scanner portion 120 and specifies the kind of the original document org, the size, and either the copy operation or the scanner operation using the control panel 58. Also, the user sets the address of a computer PC1 linked via the network as the destination of the image information, and the operation starts as the start button is depressed. The image information read by the scanner portion 120 is stored in the memory 51M, and is later subjected to processing of this embodiment and, when the need arises, desired compression processing, such as the JPEG format and the PDF format, in the image processing portion 14 at the latter stage. The compressed image information is transferred to the external computer PC1 over the network via the system control portion 59.

Figure 13:
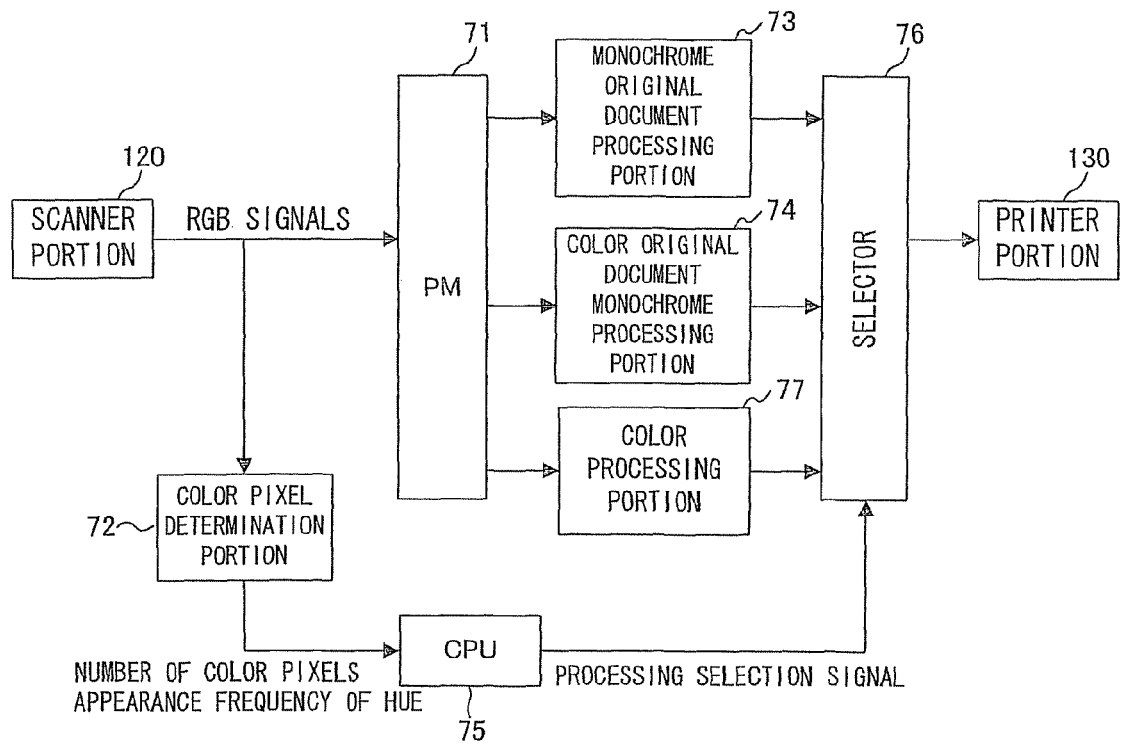
FIG. 13 is a block diagram showing the configuration of an image processing portion shown in FIG. 9.

The configuration of the image processing portion in this embodiment of the invention will be described with reference to FIG. 13. The color signals (RGB signals) outputted from the scanner portion 120 are saved in a page memory (hereinafter, abbreviated to PM) 71 and inputted into a color pixel determination portion 72 at the same time. An image (RGB image) of the RGB signals inputted into the PM 71 is inputted to a monochrome original document processing portion (second monochrome processing unit or second monochrome processing means) 73 that processes a monochrome original document, a color original document monochrome processing portion (first monochrome processing unit or first monochrome processing means) 74 that processes a monochromatic color original document, and a color processing portion (color processing means) 77 that processes a multi-color color original document, which is an original document having more than one color. The respective processing results are selected by a selector 76 and outputted to the printer portion 130. A CPU 75 outputs a changeover signal to the selector 76 according to an output signal from the color pixel determination portion 72. It should be noted that the CPU 75 forms a selection unit (selection means) of the invention.

When the ACS mode described above is selected through the control panel, each original document is determined as being a color original document or a monochrome original document by the color pixel determination portion 72 using the RGB signals outputted from the scanner portion 120, and processing suitable for each of the color original document and the monochrome original document is performed.

The color pixel determination portion 72 calculates |R−G|, |G−B|, and |B−R| pixel by pixel for the RGB signals inputted therein. The average value by the unit of 5×5 region is calculated for |R−|, |G−B|, and |B−R| thus calculated. A total number of the color pixels is then calculated using the conditional equation below for the calculated average values (defined as ave(|R−G|), ave (|G−B|) and ave (|B−R|)):

If (ave(|R−G|)>th1 or ave(|G−B|)>th2 or ave(|B−R|)>th3),
then count as a color pixel→col_cnt=col_cnt+1 else, do not count.

The initial value of col_cnt is 0, and the initialization takes place for every original document.

Also, the color pixel determination portion 72 calculates a total number of the color pixels and performs at the same time the hue determination pixel by pixel to determine to which of black, red, yellow, green, cyan, blue, magenta, and white the pixel of interest corresponds. The hue determination method is the same as the method used in the color original document monochrome processing described below.

On the basis of the result of the hue determination performed pixel by pixel and with reference to the region of the 5×5 size, the hue present within the region at the highest frequency is determined as the representative hue of this 5×5 region. The representative hue is calculated for the entire region of the original document, and total appearances of the representative hues are outputted to the CPU 75.

By performing the color pixel determination processing for the entire region of the original document in this manner, it is possible to determine a total number of the color pixels present in the original document and a total number of color hues used as the color pixels.

Figure 14:
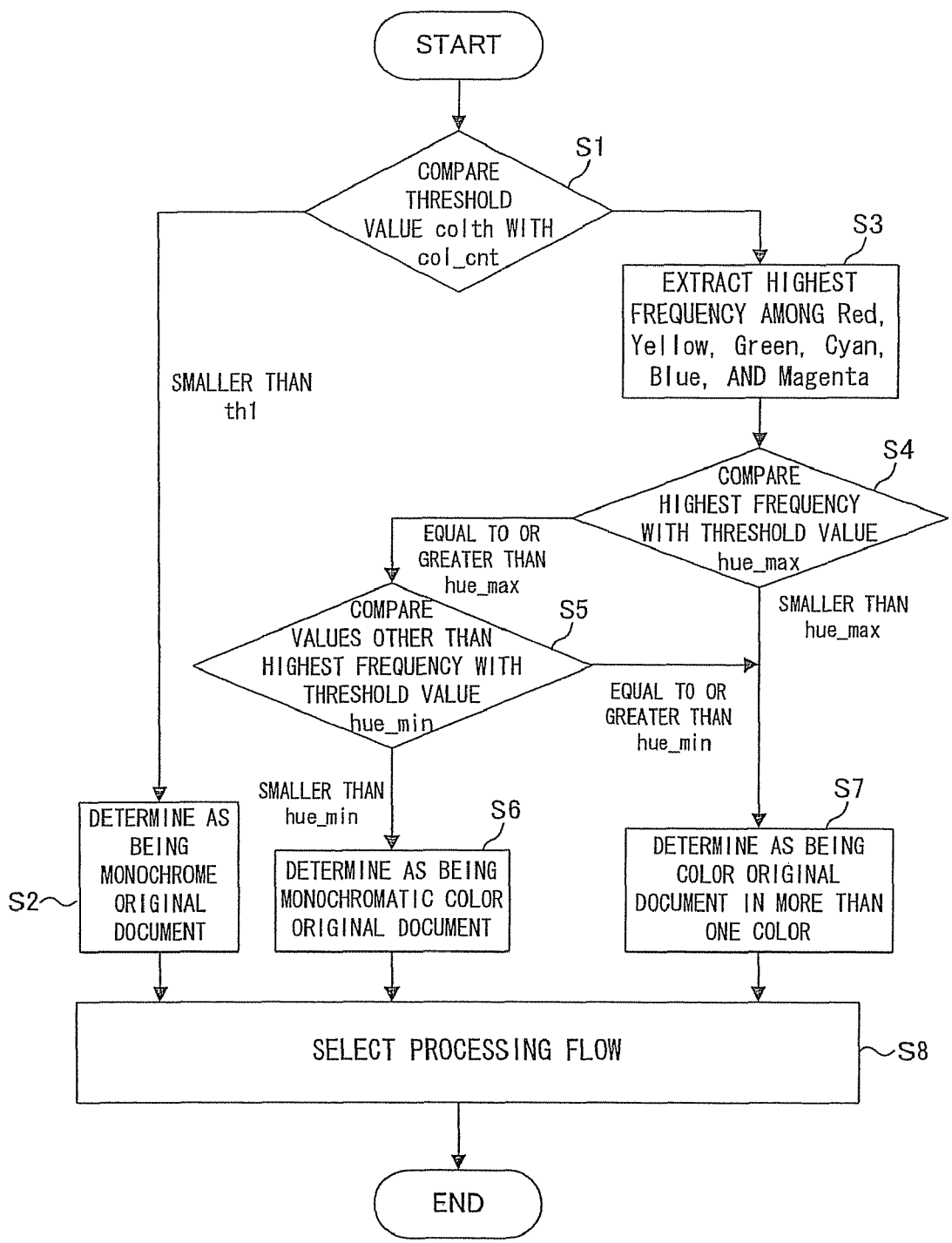
FIG. 14 is a flowchart showing original document determination processing performed by a CPU in the image processing portion.

Accordingly, col_cnt specifying the number of the color pixels and red_cnt, yellow_cnt, green_cnt, cyan_cnt, blue_cnt, and magenta_cnt specifying total appearances of the color hues are outputted to the CPU 75, and determination as being a monochrome original document, a monochromatic color original document, or a color original document is performed in accordance with the flow shown in FIG. 14.

In the processing shown in FIG. 14, the CPU 75 performs determination as being a color original document or a monochrome original document by comparing the pre-set threshold value colth with the col_cnt value (Step S1). When the number of the color pixels is a value smaller than colth, the CPU determines the original document as being a monochrome original document (Step S2), and gives an instruction to the selector 76 to select the monochrome original document processing portion 73 (Step S8).

When the number of the color pixels is equal to or greater than colth, the largest value of the frequencies of the respective color hues excluding black and white is extracted (Step S3). The largest value is compared with the threshold value Hue_max (Step S4), and when it is equal to or greater than the threshold value, the original document is provisionary determined as being a monochromatic color original document. Subsequently, the frequencies of the hues excluding black, white, and the hue at the highest frequency are compared with the threshold value Hue_min. When all the comparison results are found to be smaller than the threshold value hue_min, the original document is determined as being a monochromatic color original document (Step S5). In this case, the CPU gives an instruction to the selector 76 to select the color original document monochromatic processing portion 74 (Step S8).

In Step S4, when the hue at the highest frequency is smaller than Hue_max and the frequency of at least any one of the other hues is equal to or greater than Hue_min, the original document is determined as being a color original document using more than one color (Step S7), and an instruction is given to the selector 76 to select the color processing portion 77 (Step S8).

The reason why a comparison with the threshold value Hue_min is made in this manner is to reduce a quantity of consumed toner particles by performing a monochrome output when the original document is made of characters alone even when it is a color original document. Generally, characters present in the original document account for about 10% of all the pixels, and a monochrome output is possible even when characters in color are present. On the contrary, in a case where a color picture is present in the original document, because the original document does not satisfy the conditions specified above, it is possible to determine as being an original document made of color characters or an original document containing a color picture. It may be configured in such a manner that the threshold values, colth, Hue_max, and Hue_min, used for the determination as being a monochrome original document, a monochromatic color original document, or a color original document, can be adjusted from the control panel.

Operations after the determination as being a monochrome original document, a monochromatic color original document, or a multi-color color original document by the CPU 75 will now be described.

In the case of the determination as being a monochrome original document, a monochrome signal is generated by performing the RGB averaging processing for the RGB signals inputted from the PM 71 using the monochrome original document processing portion 73. The base removing processing, the filter processing, the binary error diffusion processing, and so forth are performed to the monochrome signal, after which the signal is outputted to the selector 76. Because the monochrome processing is a known technique, descriptions thereof are omitted herein.

In a case where the inputted original document is determined as being a monochromatic color original document, the color original document monochrome processing portion 74 is selected. As is shown in FIG. 15, in the color original document monochrome processing portion 74, the RGB signals from the PM 71 are inputted into base removing processing portions 51 through 53, respectively.

Figure 15:
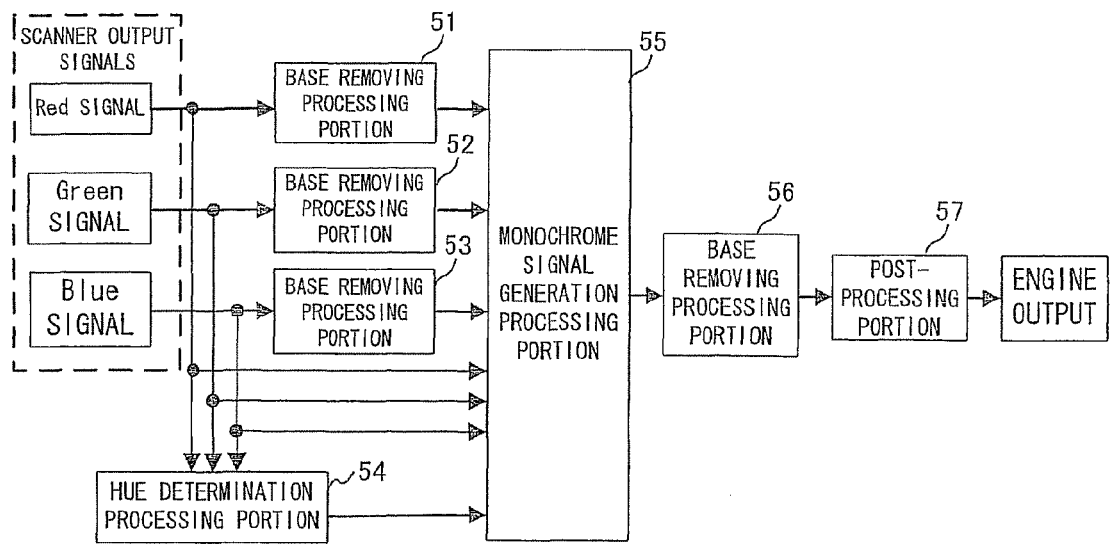
FIG. 15 is a block diagram showing the configuration of a color original document monochrome processing portion shown in FIG. 13.
Figure 16:
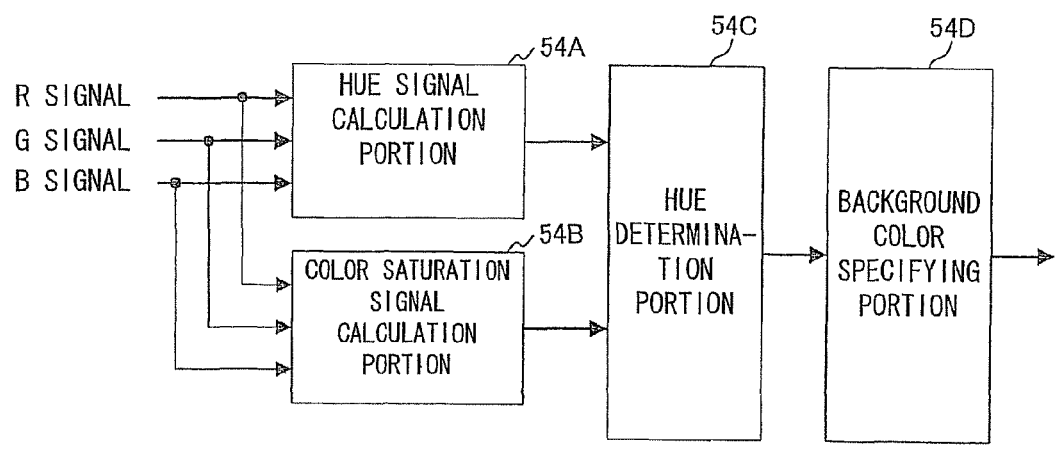
FIG. 16 is a block diagram showing the configuration of a hue determination processing portion shown in FIG. 15.

Referring to FIG. 15 and FIG. 16, the configuration of the color original document monochrome processing portion 74 of this embodiment will be described. Regarding the color signals (RGB signals) outputted from the scanner portion 120, the RGB signals are inputted, respectively, into the base removing processing portions 51, 52, and 53 distinctively and independently (separately). The base removing processing portions 51, 52, and 53 calculate histogram for the signals inputted therein for every sub-scanning line, and calculate the signal value at the highest frequency as the white reference value. The base removing processing is performed by performing a re-normalizing computation using the white reference value thus calculated and the pre-set black reference value. The equation for the re-normalizing computation is as follows.

$$OUTimg = (INimg - \text{black reference value})/(\text{white reference value} - \text{black reference value}) \times 255$$

Herein, OUTimg is an output signal for re-normalization and INimg is an input image signal.

The hue determination processing portion 54 calculates hue and color saturation using the RGB signals as is shown in FIG. 16. To be more concrete, a hue signal and a color saturation signal are calculated using the equation below, respectively, in a hue signal calculation portion 54A and a color saturation calculation portion 54B from the RGB signals.

$$\text{hue signal} = \tan^{-1}((R-G)/(G-B)) \ast 180/\pi$$

$$\text{color saturation signal} = \text{Max}(|R-G|, |G-B|).$$

Herein, Max($|R-G|$, $|G-B|$) means that the absolute value of R−G and the absolute value of G−B are compared with each other to output whichever is the greater.

The hue is determined by a hue determination portion 54C from the hue and color saturation signals thus calculated. To be more concrete, the calculated color saturation signal is compared with a threshold value thc and a density threshold value thd to determine whether the hue is a chromatic color, black, or white:

if color saturation signal<thc and MAX(R, G, B)<thd, then the hue is black;

if color saturation signal<thc and MAX(R, G, B)≧thd, then the hue is white; and if color saturation signal≧thc, then the hue is a chromatic color.

Figure 17:
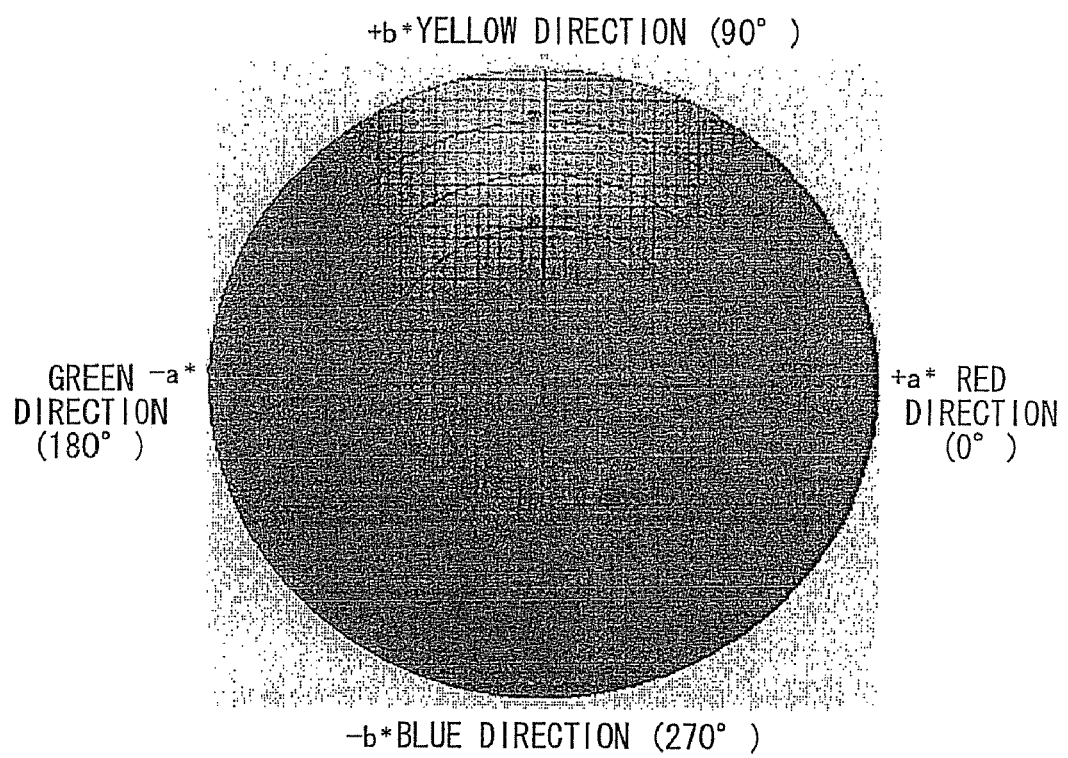
FIG. 17 is a view showing a hue circular disk used to determine hues.

In a case where the hue is found to be a chromatic color as the result of determination, the hue is determined using the hue signal. To be more concrete, as is shown in the hue circular disk of FIG. 17, the color signal can indicate the hue by the angles: given 0° as red, then yellow (about 90°), green (180°), and blue (270°). Hence, by comparing the hue signal thus found with the conditional equations below, it is possible to determine the hue.

Conditional Equations:

if hue signal≦thh1 or hue signal>thh6, then the hue is red;
if thh1<hue signal≦thh2, then the hue is yellow;
if thh2<hue signal≦thh3, then the hue is green;
if thh3<hue signal≦thh4, then the hue is cyan;
if thh4<hue signal≦thh5, then the hue is blue; and
if thh5<hue signal≦thh6, then the hue is magenta.

The hue is determined pixel by pixel on the basis of the determinations as above.

The hue results determined by the hue determination portion 54C are inputted into a background color specifying portion 54D. The background color specifying portion 54D calculates total frequencies of hues including black, red, yellow, green, cyan, blue, magenta, and white in a region of main scanning 7016 pixels×sub-scanning 3 lines (one line before and one line after the line being processed). The color forming the background of the line being processed is specified (determined) by comparing the total frequencies of the respective hues thus calculated with a specific threshold value. To be more concrete, the color is specified under the conditions as follows.

Conditional Equations:

if a total frequency of black>bg_th1, then the black hue is the background;

if a total frequency of black≦bg_th1, then the black hue is not the background;

if a total frequency of red>bg_th2, then the red hue is the background; and if a total frequency of red—bg_th2, then the red hue is not the background.

Threshold determination is performed for each of yellow, green, cyan, blue, magenta, and white in the same manner.

A monochrome signal generation processing portion 55 (FIG. 15) generates a monochrome signal using the RGB signals outputted from the base removing processing portions 51, 52, and 53 (defined as rng_R, rng_G, and rng_B, respectively), the RGB signals outputted from the scanner portion 120, and the hue determination result of each pixel and the background color determination result by the unit of line outputted from the hue determination processing portion 54. To be more concrete, a monochrome signal to be outputted is determined under the condition as follows.

| Hue result of pixel of interest | Background determination result | Monochrome output signal |
| --- | --- | --- |
| Black | background | 255 − Max(rng_R, rng_G, rng_B) |
| | non-background | 255 − Max(rng_R, rng_G, rng_B) |
| Red | background | 255 − rng_R |
| | non-background | 255 − (G + B)/2 |
| Yellow | background | 255 − (rng_R + rng_G)/2 |
| | non-background | 255 − B |
| Green | background | 255 − rng_G |
| | non-background | 255 − (R + B)/2 |
| Cyan | background | 255 − (rng_G + rng_B)/2 |
| | non-background | 255 − R |
| Blue | background | 255 − rng_B |
| | non-background | 255 − (R + B)/2 |
| Magenta | background | 255 − (rng_G + rng_B)/2 |
| | non-background | 255 − G |
| White | background | 255 − Min(R, G, B) |
| | non-background | 255 − Min(R, G, B) |

Each monochrome output signal is subtracted from 255, and this subtraction is performed because white is indicated by "255" and black is indicated by "0" in the RGB signal system, whereas a monochrome signal indicates white as "0" and black as "255".

The reason why different RGB signals are used for the background and the non-background as described above is as follows, by way of example, in the case of the red hue. When a red original document is read, the RGB signals outputted from the scanner are red=255, green=0, and blue=0 in the ideal state. In the case of the background, when a red signal is used, the value of the background becomes "0" when converted to monochrome. In the case of the non-background, that is, in the case of characters, because it is necessary to output them in black when converted to monochrome, green and blue signals are used. Because the green and blue signals are "0", black becomes "255" when converted to monochrome. However, signals are never outputted in such an ideal state in the actual scanner. Hence, by using a signal having undergone the base removing processing for the hue determined as being the background, covering (assimilation of the non-background and the background) that occurs when converted to monochrome is suppressed.

It is possible to further remove the background by performing the base removing processing by a base removing processing portion 56 for the signal converted to monochrome. The processing method of the base removing processing portion 56 is the same as that of the base removing processing portions 51, 52, and 53. A post-processing portion 57 performs the filter processing and the tone processing, such as the binary error diffusion, to a signal outputted from the base removing processing portion 56 and outputs the resulting signal to the selector 76.

In the case of determination as being a color original document, the color conversion, the filter processing, the inking processing, and the tone processing are applied to the RGB signals using the color processing portion 77, and the resulting signal is outputted to the selector 76. Because the processing of colors is also a known technique, detailed descriptions are omitted herein.

Figure 19:
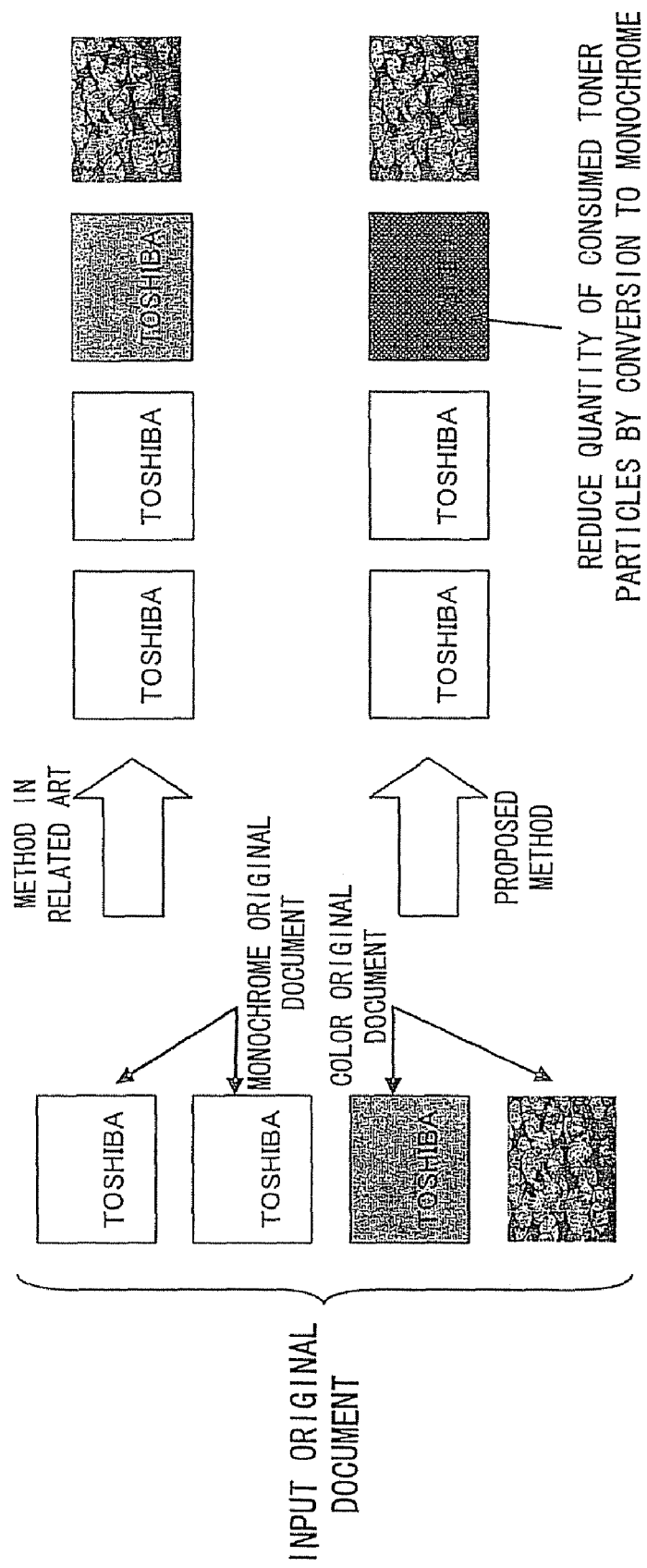
FIG. 19 is a view showing an advantage of the embodiment.

As has been described, by not only determining whether an original document is a color original document or a monochrome original document, but also referring to the appearance frequencies of hues used in a color original document, it is possible to determine whether an original document is a color original document reproduced in a single color. By using the color original document monochrome processing for the monochromatic color original document, monochrome reproduction is enabled in a satisfactory manner without deteriorating the visibility as are shown in FIG. 18 and FIG. 19 even when a monochrome output is performed. In addition, because a color output is not performed, toner particles are not consumed unnecessarily.

From FIG. 18, it is obvious that an image having neither covering nor smearing can be achieved. In other words, an original color image shown in FIG. 18(*a*) is not printed clearly as is shown in FIG. 18(*b*) by an image processing apparatus in the related art. On the contrary, according to the image processing apparatus of the embodiment above, it is printed clearly as is shown in FIG. 18(*c*).

Second Embodiment

Figure 20:
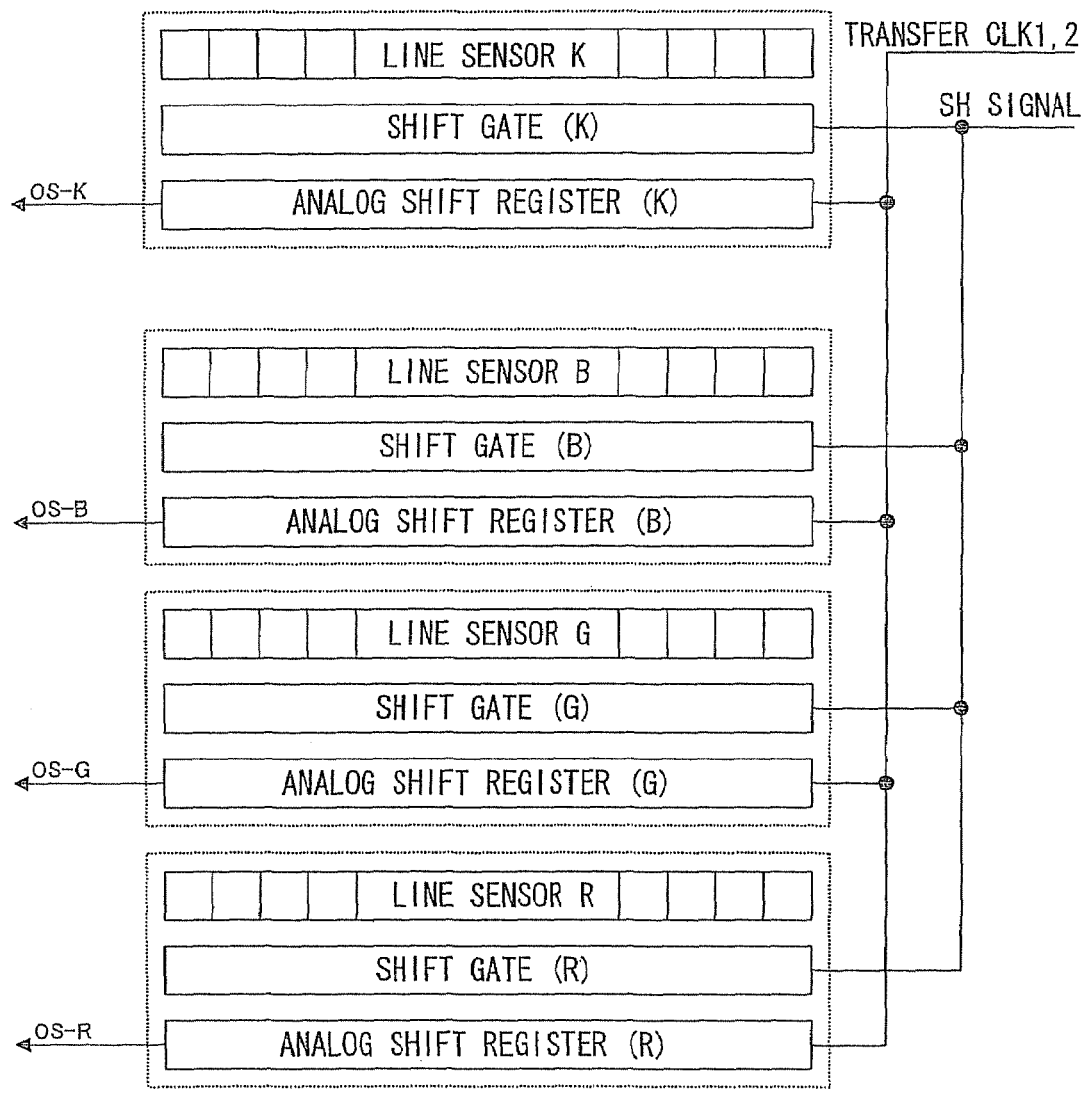
FIG. 20 is a block diagram schematically showing the configuration of a 4-line CCD sensor according to a second embodiment of the invention.

As a second embodiment, a case where a 4-line sensor as is shown in FIG. 20 is used as the CCD line sensor (image reading unit and image reading means) will be described. The scanner portion 120 is of the same configuration except for the line sensor, and the printer portion 130 is of the same configuration, too.

FIG. 20 is a view schematically showing the configuration of a 4-line CCD sensor formed of a total of four line sensors, including a line sensor K on the light-receiving surface of which is disposed no color filter, and three line sensors (line sensor B, line sensor G, and line sensor R) on the light-receiving surfaces of which are disposed color filters in blue, green, and red (hereinafter, abbreviated to B, G, and R, respectively).

The line sensor K, B, G, and R portions are made of photo diode arrays, and perform photoelectric conversion operations. Signals outputted from the 4-line CCD sensor are subjected to analog processing or the like, and also subjected to processing, such as the shading correction and the logarithmic transformation, after which they are inputted into an image processing portion shown in FIG. 21.

Figure 21:
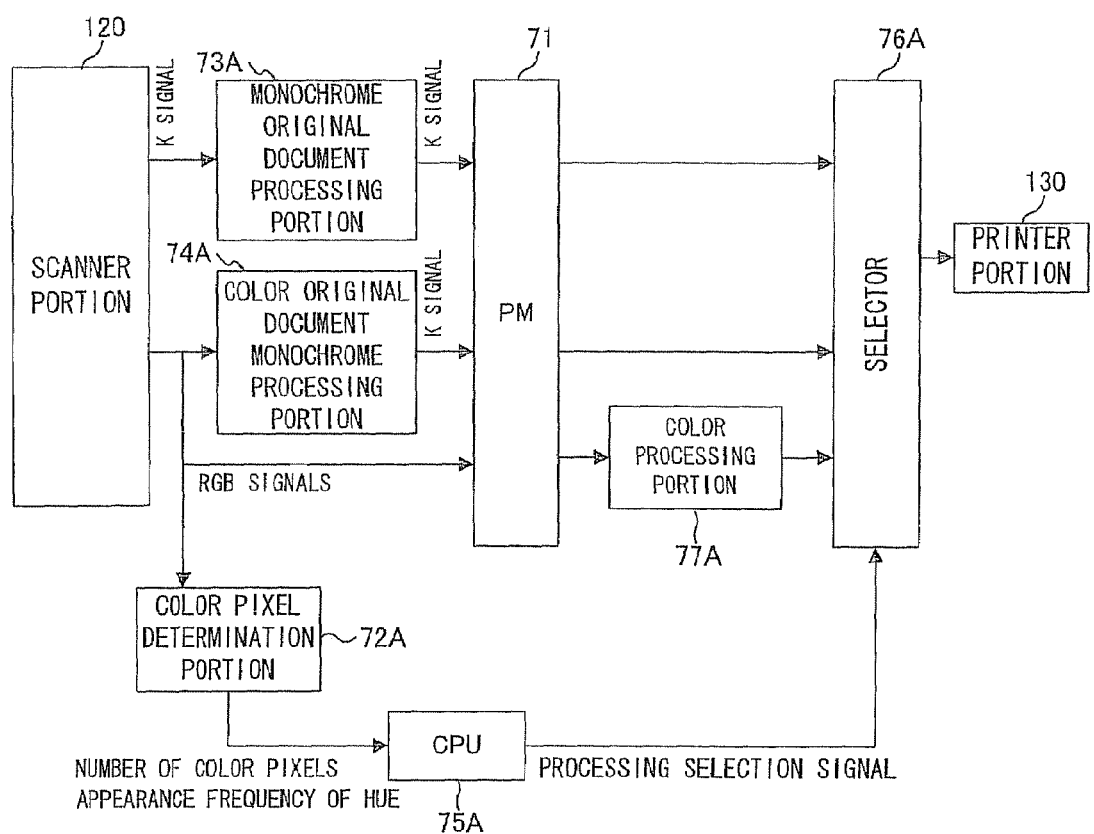
FIG. 21 is a block diagram showing the configuration of an image processing portion according to the second embodiment of the invention.

FIG. 21 is a block diagram showing the configuration of the image processing portion (corresponding to the image processing apparatus) of the second embodiment. In this image processing portion, a monochrome original document processing portion (second monochrome processing unit) 73A performs the monochrome original document processing using a K signal inputted therein, and at the same time, a color original document monochrome processing portion (first monochrome processing portion) 74A performs the monochromatic color original document processing (color original document monochrome processing) using the RGB signals inputted therein. The resulting monochrome binary images having undergone the corresponding processing are stored in the PM 71A at the same time.

The RGB signals are also inputted into a color pixel determination portion 72A, and the number of color pixels is counted page by page, and the number of the color pixels is outputted to a CPU 75A. The CPU 75A (selection unit and selection means) compares the number of the color pixels with the specific threshold value to determine whether an original document is a multi-color color original document, a monochromatic color original document, or a monochrome original document, and selects either one of the image data for the color (monochromatic or multi-color) original document and the image data for a monochrome original document stored at the same time in the PM 71A so as to be selected by a selector 76A. The image data thus selected is outputted to the printer 130. By using the configuration described above, it is possible to temporarily store the image data when determined as being a monochrome original document and the monochrome image data when determined as being a monochromatic color original document in the PM 71A. In the case of determination as being a multi-color color original document, a color processing portion 77A performs the image processing using multi-color color data stored in the PM 71.

By configuring in this manner, the CPU 75A is able to read out the data stored in the PM 71A for an image to be displayed on the control panel, which allows the user to confirm the finish before the image is outputted on a sheet of paper. After the user confirms the finish, he is able to select a desired output image from three options: a monochrome output, a monochrome output for a monochromatic color original document, and a multi-color color output. In a case where the selection result of the user and the determination result of the CPU 75A do not coincide with each other, an image may be outputted, for example, by placing priority on the selection result of the user. According to this configuration, the user is able to confirm the finish before printing in a case where a color ordinal document is outputted in monochrome or in color, which can forestall erroneous copying.

What is claimed is:

1. An image processing apparatus, comprising:
   a color processing unit configured to perform color image forming processing for a multi-color color original document made of more than one color;
   a first monochrome processing unit configured to perform monochrome image forming processing for a monochromatic color original document made of a single color and comprising,
      a base removing processing portion configured to output base-removed-RGB signals by removing a base of RGB signals of image data of the monochromatic color original document,
      a hue determination processing portion configured to determine whether the hue of each pixel is chromatic or black or white based on the RGB signals,
      a background color specifying portion configured to determine whether the color of each pixel is a background color or not by using the hue determination result of each pixel, and
      a monochrome signal generation processing portion configured to generate and output a monochrome signal by using the RGB signals, the base-removed-RGB signals, hue determination results, and background color determination results, the monochrome signal generation processing portion is further configured to generate the monochrome signal about a pixel of interest by using the base-removed-RGB signals when a color of the pixel of interest is chromatic and the background color and to generate the monochrome signal about the pixel of interest by using the RGB signals when the color of the pixel of interest is chromatic and not the background color;
   a second monochrome processing unit configured to perform monochrome image forming processing different from the monochrome image forming processing by the first monochrome processing unit for a monochrome original document; and
   a selection unit configured to enable appropriate selective use of the color processing unit, the first monochrome processing unit, and the second monochrome processing unit for each original document.

2. The image processing apparatus according to claim 1, wherein:
   the selection unit determines whether an original document is a multi-color color original document, a monochromatic color original document, or a monochrome original document for each original document acquired through reading, and selects an output of at least one of the color processing unit, the first monochrome processing unit, and the second monochrome processing unit according to a result of the determination.

3. The image processing apparatus according to claim 2, wherein:
   in determination processing by the selection unit, a signal indicating chromatic saturation is generated from an input signal, the chromatic saturation signal is compared with a specific threshold value to calculate a total number of color pixels present in an original document, and whether the original document is a monochrome original document is determined by comparing the total number of the color pixels with a specific threshold value; and
   in a case where the original document is determined as not being a monochrome original document, a signal indicating a hue is generated from the input signal, frequencies of hues present in the original document are calculated using the hue signal, and whether the original document is a multi-color color original document or a monochromatic color original document is determined by comparing the frequencies of the hues with a specific threshold value.

4. The image processing apparatus according to claim 3, wherein:
   the selection unit classifies hues into at least eight states including red, yellow, green, cyan, blue, magenta, black, and white for determination as being a chromatic color original document or a multi-color color original document.

5. The image processing apparatus according to claim 4, wherein:
   regarding the determination as being a monochromatic color original document or a multi-color color original document, whether the original document is a monochromatic color original document or a color original document in more than one color is determined by comparing a hue having a highest frequency among the hues excluding black and white with a specific first threshold value, and comparing all the hues excluding black and white with a specific second threshold value.

6. The image processing apparatus according to claim 2, further comprising:
   a color original document mixed mode setting unit configured to allow a user to set a mode in which a determination operation by the selection unit is performed for every original document as a color original document mixed mode.

7. The image processing apparatus according to claim 6, wherein:
   when the color original document mixed mode is set by the color original document mixed mode setting unit, the selection unit stores images formed by each of the first monochrome processing unit and the second monochrome processing unit into a memory unit, and displays the images stored in the memory unit.

8. The image processing apparatus according to claim 7, wherein:
the selection unit allows the user to select the images formed by each of the first monochrome processing unit and the second monochrome processing unit and being displayed by the display unit.

9. The image processing apparatus according to claim 8, wherein:
the selection unit further allows the user to select an image processed by the color processing unit instead of the images formed by each of the first monochrome processing unit and the second monochrome processing unit.

10. The image processing apparatus according to claim 7, further comprising:
an image reading unit configured to be able to read RGB signals and a monochrome signal,
wherein:
the first monochrome processing unit performs image forming processing using the RGB signals; and
the second monochrome processing unit performs the image forming processing using the monochrome signal.

11. The image processing apparatus according to claim 1, further comprising:
an image reading unit configured to be able to read RGB signals and a monochrome signal,
wherein the color processing unit and the first monochrome processing unit perform processing using the RGB signals and the second monochrome processing unit performs processing using the monochrome signal.

12. An image processing apparatus, comprising:
color processing means for performing color image forming processing for a multi-color color original document made of more than one color;
first monochrome processing means for performing monochrome image forming processing for a monochromatic color original document made of a single color and comprising,
base removing processing means for outputting base-removed-RGB signals by removing a base of RGB signals of image data of the monochromatic color original document,
hue determination processing means for determining whether the hue of each pixel is chromatic or black or white based on the RGB signals,
background color specifying means for determining whether the color of each pixel is a background color or not by using the hue determination result of each pixel, and
monochrome signal generation processing means for generating and outputting a monochrome signal by using the RGB signals, the base-removed-RGB signals, hue determination results, and background color determination results, the monochrome signal generation processing means further generates the monochrome signal about a pixel of interest by using the base-removed-RGB signals when a color of the pixel of interest is chromatic and the background color and generates the monochrome signal about the pixel of interest by using the RGB signals when the color of the pixel of interest is chromatic and not the background color;
second monochrome processing means for performing monochrome image forming processing different from the monochrome image forming processing by the first monochrome processing unit for a monochrome original document; and
selection means for enabling appropriate selective use of the color processing means, the first monochrome processing means, and the second monochrome processing means for each original document.

13. The image processing apparatus according to claim 12, wherein:
the selection means determines whether an original document is a multi-color color original document, a monochromatic color original document, or a monochrome original document for each original document acquired through reading, and selects an output of at least one of the color processing means, the first monochrome processing means, and the second monochrome processing means according to a result of the determination.

14. The image processing apparatus according to claim 13, wherein:
in determination processing by the selection means, a signal indicating chromatic saturation is generated from an input signal, the chromatic saturation signal is compared with a specific threshold value to calculate a total number of color pixels present in an original document, and whether the original document is a monochrome original document is determined by comparing the total number of the color pixels with a specific threshold value; and
in a case where the original document is determined as not being a monochrome original document, a signal indicating a hue is generated from the input signal, frequencies of hues present in the original document are calculated using the hue signal, and whether the original document is a multi-color color original document or a monochromatic color original document is determined by comparing the frequencies of the hues with a specific threshold value.

15. The image processing apparatus according to claim 14, wherein:
the selection means classifies hues into at least eight states including red, yellow, green, cyan, blue, magenta, black, and white for determination as being a chromatic color original document or a multi-color color original document.

16. The image processing apparatus according to claim 14, wherein:
regarding the determination as being a monochromatic color original document or a multi-color color original document, whether the original document is a monochromatic color original document or a color original document in more than one color is determined by comparing a hue having a highest frequency among the hues excluding black and white with a specific first threshold value, and comparing all the hues excluding black and white with a specific second threshold value.

17. The image processing apparatus according to claim 13, further comprising:
color original document mixed mode setting means for allowing a user to set a mode in which a determination operation by the selection means is performed for every original document as a color original document mixed mode.

18. The image processing apparatus according to claim 12, further comprising:
image reading means capable of reading RGB signals and a monochrome signal, wherein the color processing means and the first monochrome processing means perform processing using the RGB signals and the second monochrome processing means performs processing using the monochrome signal.

19. An image processing method performed by a computer in an image processing apparatus, comprising:
performing, by a processor, color image forming processing for a multi-color color original document made of more than one color as color processing;
performing, by the processor, monochrome image forming processing for a monochromatic color original document made of a single color as first monochrome processing, including,
base removing processing to output base-removed-RGB signals by removing a base of RGB signals of image data of the monochromatic color original document;
hue determination processing to determine whether the hue of each pixel is chromatic or black or white based on the RGB signals,
background color specifying to determine whether the color of each pixel is a background color or not by using the hue determination result of each pixel, and
monochrome signal generation processing to generate and output a monochrome signal by using the RGB signals, the base-removed-RGB signals, hue determination results, and background color determination results, the monochrome signal generation processing further generates the monochrome signal about a pixel of interest by using the base-removed-RGB signals when a color of the pixel of interest is chromatic and the background color and generates the monochrome signal about the pixel of interest by using the RGB signals when the color of the pixel of interest is chromatic and not the background color;
performing, by the processor, monochrome image forming processing different from the monochrome image forming processing in the first monochrome processing for a monochrome original document as second monochrome processing; and
enabling, by the processor, appropriate selective use of the color processing, the first monochrome processing, and the second monochrome processing for each original document.

20. The image processing method according to claim 19, wherein:
in the step of enabling the appropriate selective use, whether an original document is a multi-color color original document, a monochromatic color original document, or a monochrome original document is determined for each original document acquired through reading, and an output of at least one of the color processing means, the first monochrome processing means, and the second monochrome processing means is selected according to a result of the determination.

* * * * *